(12) United States Patent
Weakley

(10) Patent No.: US 8,949,035 B2
(45) Date of Patent: Feb. 3, 2015

(54) METHOD OF CALCULATING A FEED RATION FOR A RUMINANT

(75) Inventor: David Weakley, Pacific, MO (US)

(73) Assignee: Forage Genetics International, LLC, West Salem, WI (US)

( * ) Notice: Subject to any disclaimer, the term of this patent is extended or adjusted under 35 U.S.C. 154(b) by 0 days.

(21) Appl. No.: 13/452,510

(22) Filed: Apr. 20, 2012

(65) Prior Publication Data

US 2012/0271449 A1 Oct. 25, 2012

Related U.S. Application Data

(60) Provisional application No. 61/477,467, filed on Apr. 20, 2011.

(51) Int. Cl.
G01N 33/48 (2006.01)
A23K 1/18 (2006.01)
A23K 1/14 (2006.01)
A23K 1/16 (2006.01)

(52) U.S. Cl.
CPC .............. *A23K 1/1813* (2013.01); *A23K 1/14* (2013.01); *A23K 1/1643* (2013.01)
USPC ........................................................ 702/19

(58) Field of Classification Search
None
See application file for complete search history.

(56) References Cited

U.S. PATENT DOCUMENTS

| | | | |
|---|---|---|---|
| 3,250,622 A | 5/1966 | Brooks | |
| 4,508,737 A | 4/1985 | Forest et al. | |
| 4,615,891 A | 10/1986 | Nocek et al. | |
| 4,617,276 A | 10/1986 | Nocek | |
| 4,886,659 A | 12/1989 | Baines et al. | |
| 4,895,728 A | 1/1990 | Weakley et al. | |
| 4,957,748 A | 9/1990 | Winowiski | |
| 5,023,091 A | 6/1991 | Winowiski | |
| 5,030,468 A | 7/1991 | Van Lengerich et al. | |
| 5,030,471 A | 7/1991 | Weakley et al. | |
| 5,120,565 A | 6/1992 | Lanter et al. | |
| 5,143,737 A | 9/1992 | Richardson | |
| 5,158,791 A | 10/1992 | Nocek et al. | |
| 5,173,430 A | 12/1992 | Edwards et al. | |
| 5,540,932 A | 7/1996 | Lanter et al. | |
| 5,683,739 A | 11/1997 | Lanter et al. | |
| 5,738,866 A | 4/1998 | Lanter et al. | |
| 5,751,421 A | 5/1998 | Wright et al. | |
| 5,767,080 A | 6/1998 | Beck et al. | |
| 5,884,225 A | 3/1999 | Allen et al. | |
| 5,991,025 A | 11/1999 | Wright et al. | |
| 6,008,053 A | 12/1999 | Williams | |
| 6,114,699 A | 9/2000 | Barton et al. | |
| 6,532,420 B1 | 3/2003 | Haeffner et al. | |
| 6,907,351 B2 | 6/2005 | Julia et al. | |
| 7,174,672 B2 | 2/2007 | Beck | |
| 7,550,172 B2 | 6/2009 | Weakley | |
| 8,062,689 B2 | 11/2011 | Weakley | |
| 8,501,493 B2 | 8/2013 | Combs et al. | |
| 2003/0165487 A1 | 9/2003 | Tricarico et al. | |
| 2005/0000457 A1 | 1/2005 | Beck | |
| 2007/0254049 A1 | 11/2007 | Beck et al. | |
| 2009/0092715 A1 | 4/2009 | Beck | |
| 2009/0272889 A1 | 11/2009 | Combs | |

FOREIGN PATENT DOCUMENTS

| | | |
|---|---|---|
| EP | 0 043 202 | 4/1984 |
| EP | 1 352 567 | 10/2003 |
| GB | 2 107 567 | 5/1983 |
| WO | WO 91/05482 | 5/1991 |
| WO | WO 93/25616 | 12/1993 |
| WO | WO 96/17525 | 6/1996 |
| WO | WO 00/08947 | 2/2000 |
| WO | WO 01/41795 | 6/2001 |
| WO | WO 02/47473 | 6/2002 |
| WO | WO 02/096191 | 12/2002 |
| WO | WO 03/068256 | 8/2003 |
| WO | WO 2004/113506 | 12/2004 |

OTHER PUBLICATIONS

S. K. Ivan, R. J. Grant, D. Weakley and J. Beck,"Comparison of a Corn Silage Hybrid with High Cell-Wall Content and Digestibility with a Hybrid of Lower Cell-Wall Content on Performance of Holstein Cows", J. Dairy Sci. 88:244-254, © American Dairy Science Association, 2005.

C. C. Taylor and M. S. Allen, "Corn Grain Endosperm Type and Brown Midrib 3 Corn Silage: Site of Digestion and Ruminal Digestion Kinetics in Lactating Cows", J. Dairy Sci. 88:1413-1424, © American Dairy Science Association, 2005.

C. C. Taylor and M. S. Allen, "Corn Grain Endosperm Type and Brown Midrib 3 Corn Silage: Feeding Behavior and Milk Yield of Lactating Cows", J. Dairy Sci. 88:1425-1433, © American Dairy Science Association, 2005.

C. C. Taylor and M. S. Allen, "Corn Grain Endosperm Type and Brown Midrib 3 Corn Silage: Ruminal Fermentation and N Partitioning in Lactating Cows", J. Dairy Sci. 88:1434-1442, © American Dairy Science Association, 2005.

(Continued)

*Primary Examiner* — Pablo S Whaley

(74) *Attorney, Agent, or Firm* — Dorsey & Whitney LLP; Bridget M. Hayden

(57) ABSTRACT

Systems and methods measure ruminal undigested fiber fractions in a feed by sampling forages and grains from available feed sources, analyzing the samples to determine a starting NDF value and an ending NDF value after ruminal digestion, calculating a ruminal undigested NDF fraction based thereon; and calculating a feed ration using the ruminal undigested NDF fraction and feeding rates of the analyzed samples. Systems and methods reduce feed costs or improve milk production by analyzing feed components in a feed ration fed to a lactating ruminant, comparing the analyzed results with a feed formulation stored in memory, where the feed formulation is for controlling a rate and extent of fiber and starch digestion in the rumen, and reformulating the feed ration based on the comparison. The rate of fiber digestion may be controlled based on a determination of the ruminal undigested NDF fraction of the analyzed feed components.

16 Claims, 16 Drawing Sheets

(56) References Cited

OTHER PUBLICATIONS

Nocek et al., "Site of Digestion of Starch in the Gastrointestinal Tract of Dairy Cows and its Effect on Milk Yield and Composition", Journal of Dairy Science, vol. 74, No. 10, 1991, pp. 3598-3612.
Grant, downloaded "Feeding to Maximize Milk Solids", University of Missouri Extension, 5 pages, from http://extension.missouri.edu/xplor/agguidesidairy/q03110.htm , Oct. 1993.
Ishler et al., "Carbohydrate Nutrition for Lactating Dairy Cattle", pp. 1-11, Penn State Cooperative Extension publication, 2001.
Ishler et al., "From Feed to Milk: Understanding Rumen Function", Extension Circular 422, pp. 1-27, 1996.
Allen, "Formulating Lactating Cow Diets for Carbohydrates", pp. 79-86, Proceedings of the 5th Western Dairy Management Conference, 2001.
Rook, "The Role of Carbohydrate Metabolism in the Regulation of Milk Production", Proc. Nutr. Soc., vol. 38, pp. 309-314, 1979.
Clark et al., "Some Aspects of Feeding High Producing Dairy Cows", Journal of Dairy Science, vol. 63, pp. 873-885, 1980.
Fox et al., "A Net Carbohydrate and Protein System for Evaluating Cattle Diets: III. Cattle Requirements and Diet Adequacy", Journal of Animal Science, vol. 70, pp. 3578-3596, 1992.
Sniffen et al., "A Net Carbohydrate and Protein System for Evaluating Cattle Diets: II. Carbohydrate and Protein Availability", Journal of Animal Science, vol. 70, pp. 3562-3577, 1992.
Shaver, "Using NDF Digestibility Information in Dairy Cattle Feeding Programs", Proceedings of the 2006 Virginia Tech Feed and Nutritional Management Cow College Conference (Feb. 22-24, 2006), pp. 46-54.
Grant, "Formulating Dairy Rations for Fiber and Starch to Optimize Animal Health and Productivity", Proceedings of the 2002 Intermountain Nutrition Conference, pp. 27-34.
Allen, "Forage Fiber Digestibility in Relation to Dairy Cow Performance", Proceedings of the 2006 Intermountain Nutrition Conference, pp. 204-212.
Shaver, "Practical Application of New Forage Quality Tests", 2003 Proceedings from the Western Dairy Management Conference, pp. 17-26.
Stallings, "MILK2000—Optimizing Yield of Digestible Energy per Acre from Corn Silage", Proceedings of the 2005 Virginia Tech Feed and Nutritional Management Cow College Conference.
Schwab and Shaver, "Evaluation of Corn Silage Nutritive Value Using MILK2000", http://www.uwex.edu/ces/forage/wfc/proceedings2001/evaluation_of_corn_silage_types.htm, date unknown.
Schwab, Shaver, Hoffmann, "Development and Application of an Integrated Approach for Estimating the Nutritive Value of Corn Silage", http://www.wisc.edu/dysci/uwex/nutritn/presentn/milk2000b.pdf, 45 pages, date unknown.
Lundberg et al., "Prediction of Forage Energy Content by Near Infrared Reflectance Spectroscopy and Summative Equations", The Professional Animal Scientist 20 (2004):262-269.
Mertens, "Creating a System for Meeting the Fiber Requirements of Dairy Cows", 1997 Journal of Dairy Science 80:1463-1481.
Oba and Allen, "Effect of Brown Midrib 3 Mutation in Corn Silage of Productivity of Dairy Cows Fed Two Concentrations of Dietary Neutral Detergent Fiber 1. Feeding Behavior and Nutrient Utilitzation", 2000 J Dairy Science 83:1333-1341.
Mertens, "Nonstructural and Structural Carbohydrates", In: Van Horn, H.H., and Wilcox, C.J. (eds.) Large Dairy Herd Management. Am. Dairy Sci. Assn., Champaign, IL. pp. 219-235, 1992.
Shaver, "Corn Silage Evaluation: MILK2000 Challenges & Opportunities with MILK2006", date unknown.
Givens et al., "The Current and Future Role of Near Infrared Reflectance Spectroscopy in Animal Nutrition: a review", Australian Journal of Agricultural Research, vol. 50, (1999), pp. 1131-1145.
Wrigley, C.W., "Potential Methodologies and Strategies for the Rapid Assessment of Feed-Grain Quality", Australian Journal of Agricultural Research, vol. 50 (1999), pp. 789-805.
Mueller-Harvey, I., "Modern Techniques for Feed Analysis" In: Assessing Quality and Safety of Animal Feeds, (Food and Agricultural Organization of the United Nations, 2004), pp. 1-37.
Shenk, J. S. and Westerhaus, M.O. "The application of near infrared reflectance spectroscopy (NIRS) to forage analysis." in: Fahey, G.C., Forage quality, evaluation, and utilization. National conference on Forage quality, evaluation, and utilization, University of Nebraska, Lincoln, NE., Apr. 13-15, 1994. (ASA, CSCA, SSSA, Madison, WI, 1994), p. 406-499.
Van Kempen et al. "Near-infrared reflectance spectroscopy in precision feed formulation" Journal of Applied Poultry Research, vol. 6, (1997), pp. 471-477.
Windham, W. R., Mertens, D.R., Barton II, F.E. "Supplement 1. Protocol for NIRS calibration: sample selection and equation development and validation." in: Marten et a!., Near infrared reflectance spectroscopy (NIRS): Analysis of forage quality (USDA Agricultural handbook No. 643 Washington, D. C, 1989), pp. 96-103.
"Nutrient Requirements of Dairy", 2001, National Academy Press, Washington D.C., pp. 14, 36-40.
60$^{th}$ Annual Convention, Virginia State Feed Association and Nutritional Management "Cow" College, Feb. 22-24, 2006.
Proceedings—Feed and Nutritional Management Cow College, Jan. 11-12, 2005.
Allen, CornPicker® for Silage v. 1.05 (Corn Picker Software) downloaded https://www.msu.edu/~mdr/cornpicker1.05.xls.
Amburgh et al, "Feed and Forage Analysis—Issues in Characterizing inputs needed for CNCPS/CPM Dairy and NRC models", Cornell University, downloaded from http://www.foragetesting.org/files/2008/2._Van_Amburgh_FeedAC_NIRS_Feb_2008.pdf, Feb. 2008.
Dairyland Laboratories, Water, and Manure, Inc.: Testing Feed, Forages, Molds, Mycotoxins, Soil, Plant Tissue, downloaded from http://www.dairylandlabs.com/, date unknown.
Abstract—National Forage Testing, downloaded from http://www.foragetesting.org/, date unknown.
Abstract—NIRS Forage and Feed Testing Consortium, downloaded from http://nirsconsortium.org/, date unknown.

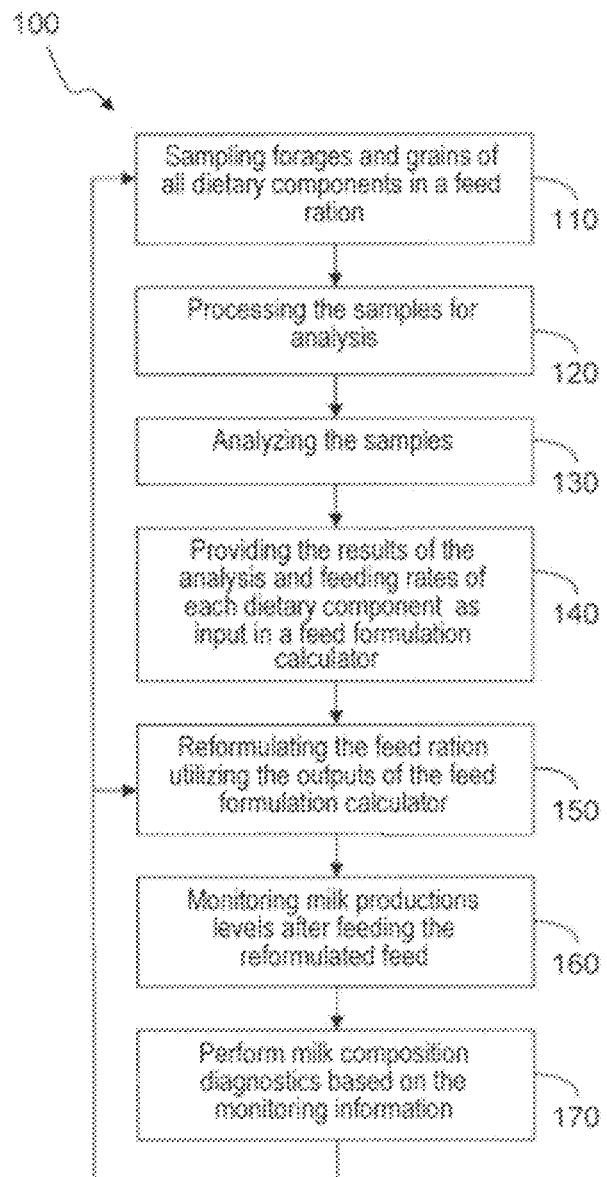

FIG. 3B

Example of using the Calibrate Calculator to reduce feed costs in the diet by substituting high cost ingredients (fine ground corn) with low cost ingredients (corn silage, soy hulls). Resulting dietary cost savings was approximately $0.34/cow/day.

FIG. 3C

| | Cost, $/ton | 35% Starch Silage | 40% Starch Silage | 40% Starch Silage |
|---|---|---|---|---|
| | 3/1/2011 | Lbs "as fed" | Lbs "as fed" | Lbs "as fed" |
| Alfalfa Hay | 180 | 17 | 17 | 17 |
| Corn Silage | 45 | 43.7 | 43.7 | 43.7 |
| Corn, Fine Ground | 270 | 10.1 | 10.1 | 8.1 |
| Soybean Hulls | 180 | 4.1 | 4.1 | 6.95 |
| Soybean Meal (SBM) | 375 | 0.4 | 0.4 | 0 |
| Protected SBM | 415 | 6.9 | 6.9 | 7.0 |
| Animal Fat | 930 | 0.4 | 0.4 | 0.1 |
| Vit/Mineral Mix | 900 | 1.35 | 1.35 | 1.35 |
| Total, lbs "as fed" | | 83.95 | 83.95 | 83.8 |
| % of Starch dig. target | | 100 | 100 | 100 |
| Crude Starch, % of DMI | | 24 | 25.0 | 25.0 |
| ME, mcal/lb DM | | 1.28 | 1.30 | 1.28 |
| MP, % of DMI | | 12.3 | 12.3 | 12.2 |
| TMR cost, $/hd/day | | $6.55 | $6.55 | $6.57 |

FIG. 8

| | Cost, $/ton 3/1/2011 | Regular Corn Lbs "as fed" | Low Corn Lbs "as fed" |
|---|---|---|---|
| Alfalfa Hay | 180 | 17 | 14.35 |
| Corn Silage | 45 | 43.7 | 50.65 |
| Corn, Fine Ground | 270 | 10.1 | 8.39 |
| Soybean Hulls | 180 | 4.1 | 5.1 |
| Soybean Meal (SBM) | 375 | 0.4 | 0 |
| Protected SBM | 415 | 6.9 | 7.87 |
| Animal Fat | 930 | 0.4 | 0.7 |
| Vit/Mineral Mix | 900 | 1.35 | 1.35 |
| Total, lbs "as fed" | | 83.95 | 89.15 |
| | | | |
| % of Starch dig. target | | 100 | 101 |
| Crude Starch, % of DMI | | 24.4 | 23.8 |
| ME, mcal/lb DMI | | 1.28 | 1.28 |
| MP, % of DMI | | 12.3 | 12.3 |
| TMR cost, $/hd/day | | 56.55 | 56.49 |

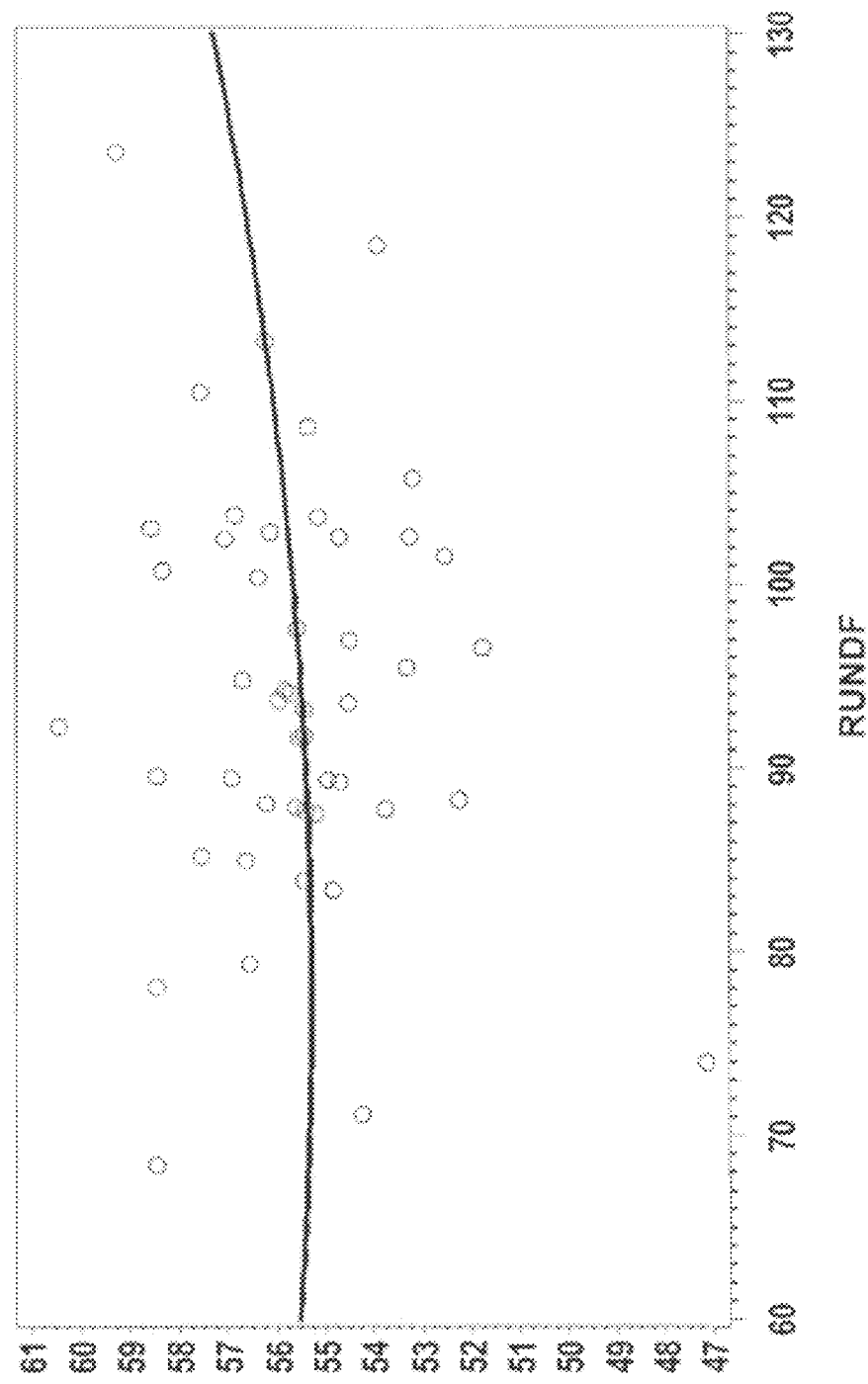

METHOD OF CALCULATING A FEED RATION FOR A RUMINANT

CROSS REFERENCE TO RELATED APPLICATION

This application claims under 35 U.S.C. §119(e) the benefit of U.S. provisional application No. 61/477,467 entitled "Methods and Systems for Adjusting Ruminally Digestible Starch and Fiber in Animal Diets" and filed Apr. 20, 2011, the disclosure of which is hereby incorporated by reference in its entirety.

FIELD OF THE INVENTION

The present disclosure relates to methods and systems for determining an animal feed ration of fiber and starch, and more particularly relates to reducing feed costs or improving milk production or efficiency in lactating animals by controlling rate and extent of fiber and starch digestion in the rumen.

SUMMARY

A system and method analyze feed components in animal diets and provide the results of the analysis as input in a feed formulation calculation that reformulates the feed components to reach a target rate and extent of ruminal digestion for the starch and fiber components to improve milk production, or efficiency and/or to decrease the cost of milk production. The rate and extent of ruminal digestion is controlled, in part, by ruminal undigested forage neutral detergent fiber (RUNDF), which provides a mat within the rumen that filters and controls the passage of contents from the rumen.

In one implementation, a method of measuring a ruminal undigested fiber fraction in a feed for reducing feed costs or improving milk production or efficiency includes sampling one or more forages and grains from available feed sources; analyzing the one or more samples to determine a starting NDF value and an ending NDF value after ruminal digestion; using the starting and ending NDF values of the one or more analyzed samples to calculate a ruminal undigested NDF fraction; and calculating a feed ration using the ruminal undigested NDF fraction and feeding rates of the one or more analyzed samples and comparing against formulation targets.

In another implementation, a method for improving and/or reducing the cost of milk production analyzes feed components in a feed ration using a processor; compares the analyzed results with feed formulation targets stored in a memory, where the feed formulation is for controlling a rate and extent of fiber and starch digestion in the rumen; and the method continues by reformulating the feed ration based on the comparison.

In yet another implementation, a computer-implemented system improves and/or reduces the cost of milk production in a ruminant animal. The system provides to a computer processor test results from analyzed feed components in a feed ration for the ruminant animal. The computer processor compares the analyzed test results with feed formulation targets stored in memory, where the feed formulation is for controlling a rate and an extent of fiber and starch digestion in the rumen. The computer processor reformulates the feed ration based on the comparison, and the reformulated feed ration is displayed on a display communicatively coupled to the processor.

BRIEF DESCRIPTION OF THE DRAWINGS

FIG. 3A is a flowchart of a method for improving and/or reducing the cost of milk production by manipulating the rate and the extent of digestion of starch and fiber in the rumen, according to the present disclosure.

FIG. 3B shows a screen shot of a feed ration calculator utilized to reduce feed costs by substituting high cost feed ingredients with lower cost feed ingredients, according to the present disclosure.

FIG. 3C illustrates two feed rations with the same amount of corn silage as fed, with one silage having increased starch (e.g., the first 40 percent starch silage or middle column), which can depress dry matter intake and milk fat.

FIG. 8 shows a cost calculation for a feed formulation utilizing the method of FIG. 3A, with a target to reduce the amount of corn grain (corn, fine ground) and therefore to reduce feed costs, according to the present disclosure.

FIG. 10 shows a graph illustrating dry matter intake and an associated RUNDF score.

DETAILED DESCRIPTION

Figure 1:
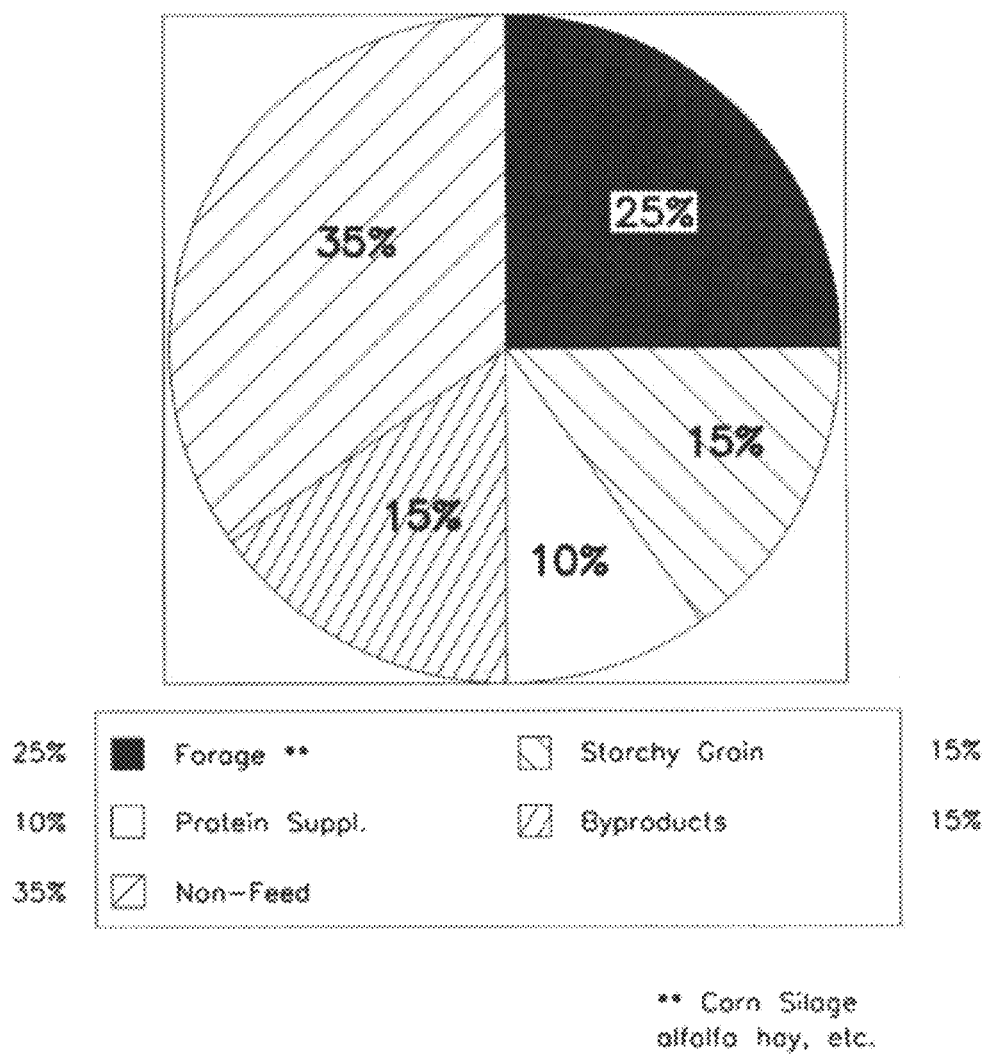
FIG. 1 shows a graph of dietary components that may cause variations in fat corrected milk production in lactating dairy cows.

Variations in animal dietary components, such as feed components including forage (e.g., corn silage, alfalfa hay, wheat straw, and the like), starch, protein and byproducts, as well as non-feed components, may cause variations in milk production, dry matter intake, milk component yields, energy retention, digestibility and feed efficiency in animals such as livestock animals, including ruminants. For example, FIG. 1 shows dietary components account for variations in fat corrected milk production in lactating dairy cows, where forage, starch, protein and byproducts, together account for about 65 percent of variation in fat corrected milk in lactating dairy cows. If not controlled, this variation may compromise milk and milk component production, as well as dry matter intake and feed efficiency. To efficiently and cost-effectively feed animals such as livestock animals, including ruminants, these sources of variation should be measured and controlled in order to predict animal performance.

Figure 2A:
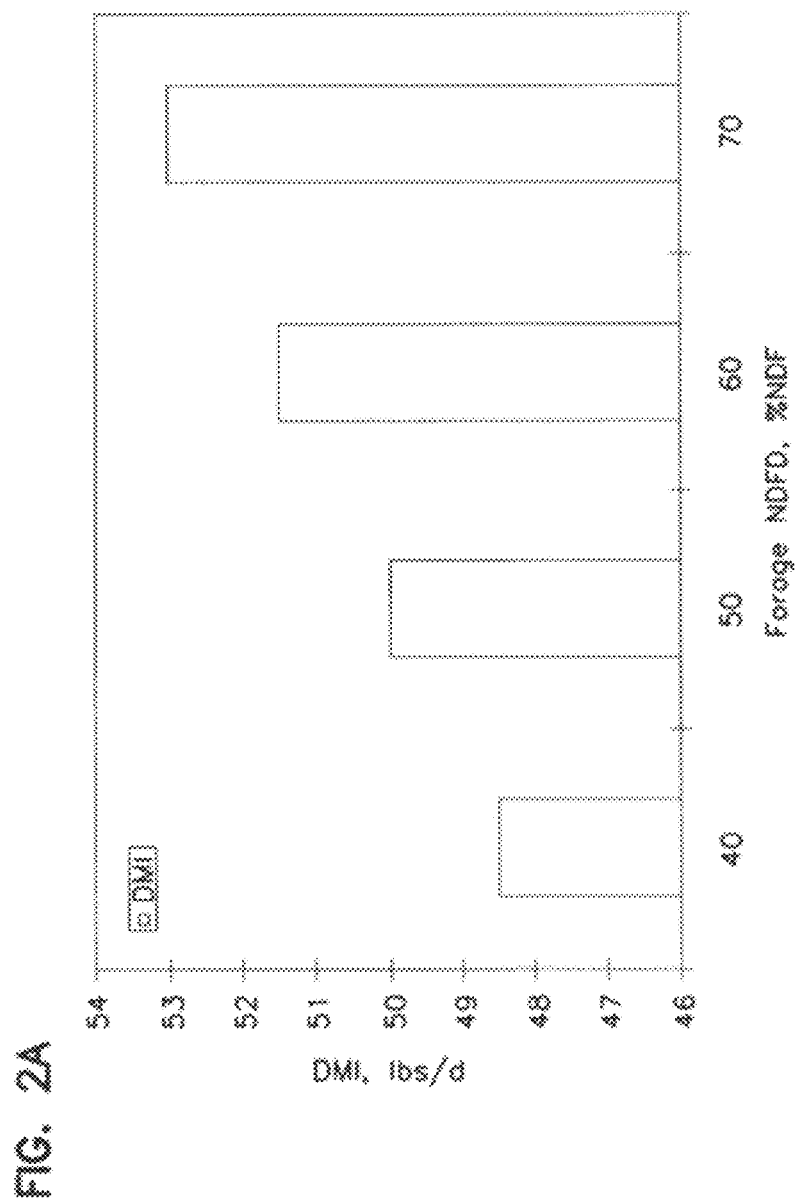
FIG. 2A shows a graph illustrating the relationship between forage NDFd content and dry matter intake in lactating dairy cows.

In addition, the starch and fiber levels in feed components, and their digestibility, affect feed intake. As neutral detergent fiber digestibility (NDFd) potential decreases, dry matter intake potential decreases. FIG. 2A shows the relationship between forage NDFd content and dry matter intake potential in lactating dairy cows. Conversely, dry matter intake potential increases with increases in NDFd. For example, a one unit increase in in vitro digestibility of NDF has been associated with a 0.37 lb/day increase in dry matter intake and a 0.55 lb/day increase in 4 percent fat corrected milk yield per cow. (Oba and Allen, 1999). Greater dry matter intake responses may be observed in early lactation, higher producing cows that are more bulk fill limited. This may be less noticeable with lower producing cows.

Generally, crude starch and fiber analyses have been utilized to manage the starch and fiber content in the diet. Crude starch and fiber analyses typically do not take into account an amount of starch and fiber digestibility in the rumen, and generally, fiber and starch digestibility analyses are not performed.

Utilizing only crude starch recommendations for formulating the diet without ruminal starch digestion information, however, is an ineffective feeding method. This is because ruminal starch digestion can be influenced by a number of factors such as grain source (corn, barley, wheat, milo, and so on); moisture content (dry shelled vs. high moisture corn); grain processing (coarse ground vs. flaked); endosperm type; level of grain in the diet (20 vs. 30 percent starch); and total dietary dry matter intake (low vs. high). While some analysis methods use in vitro testing to determine starch digestibility, generally these methods measure total tract digestion, not ruminal starch digestibility, or the testing produces inconsistent results.

Figure 2B:
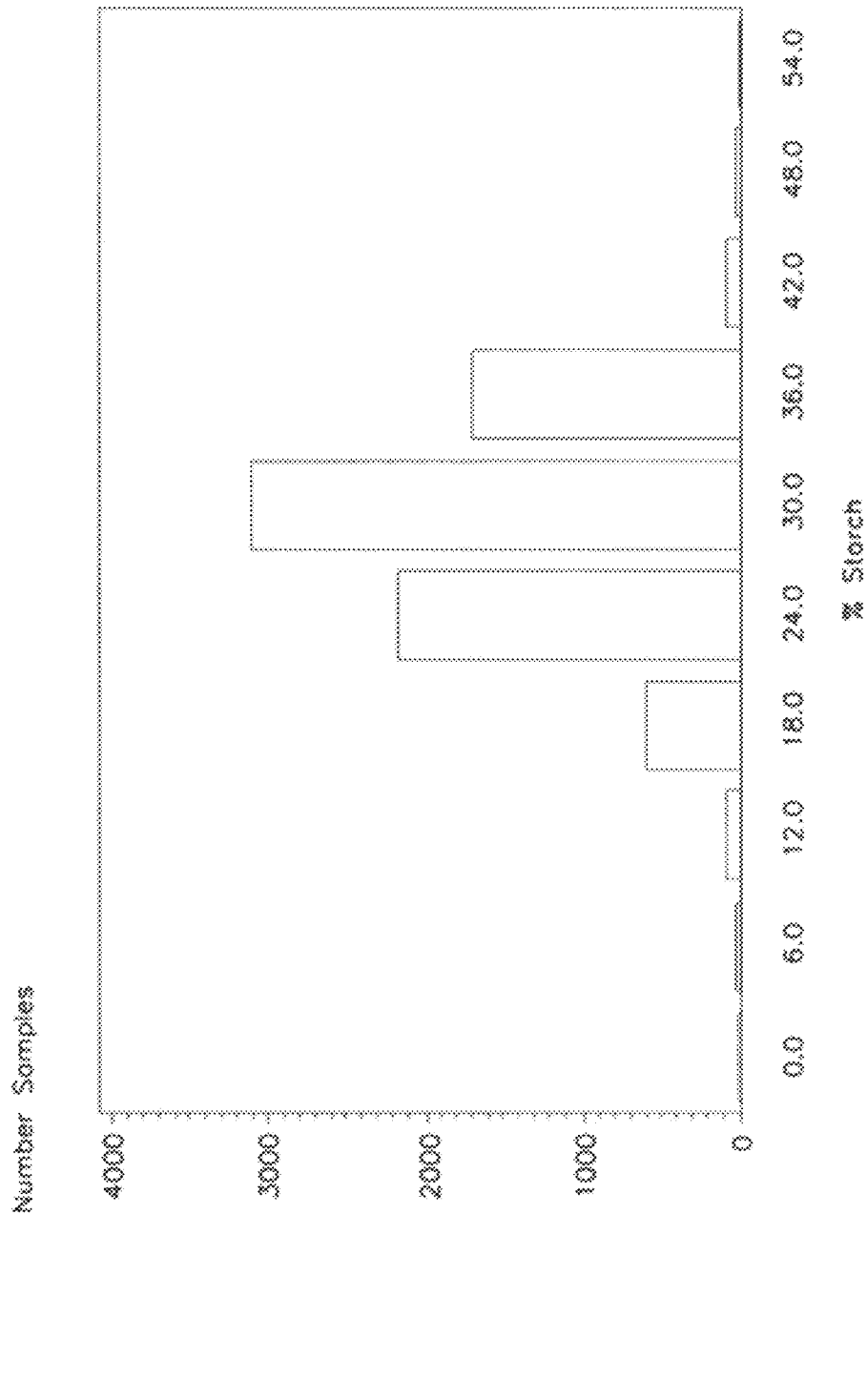
FIG. 2B is a bar graph showing the variation in percent crude starch content for corn silage samples.
Figure 2C:
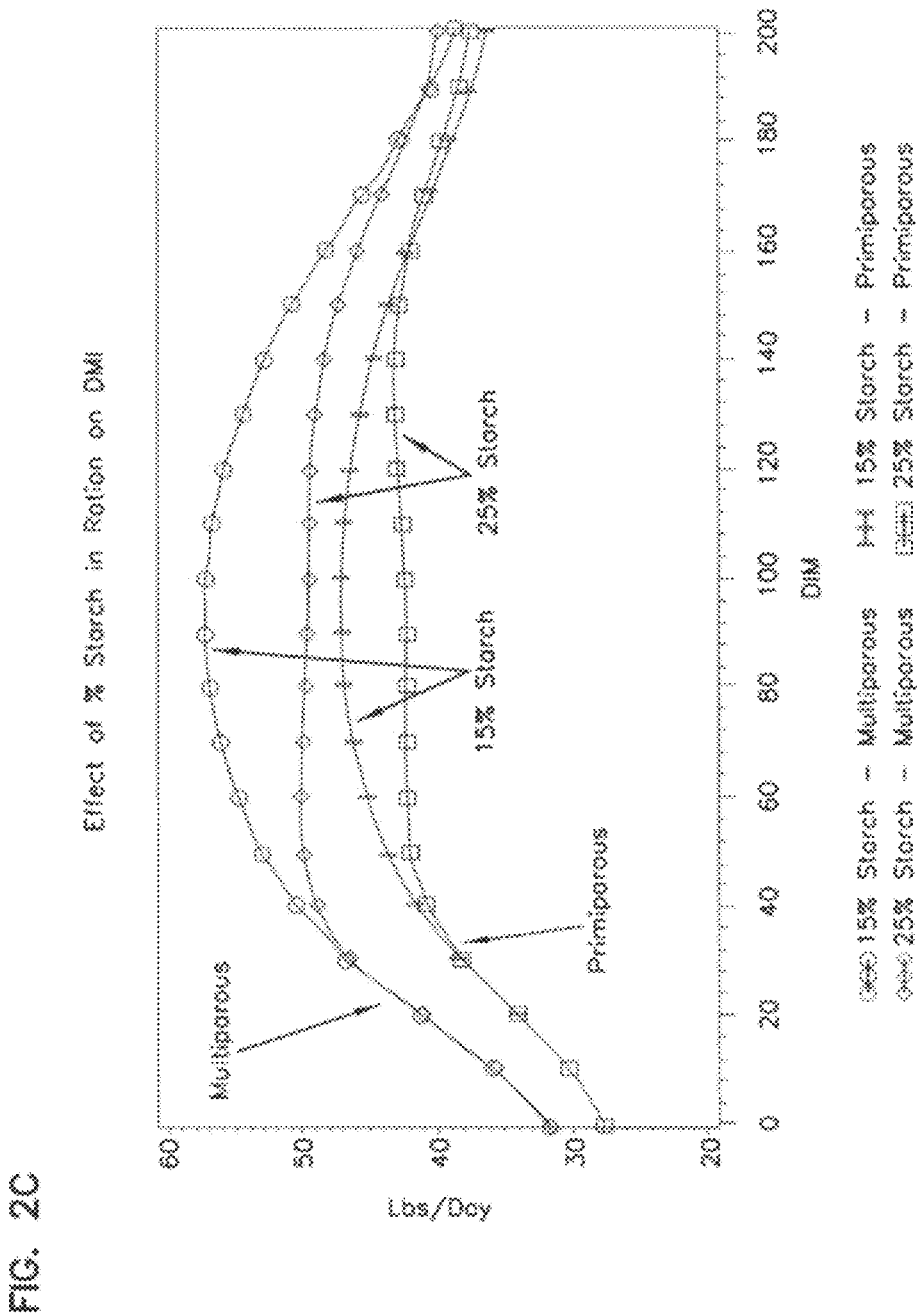
FIG. 2C is a graph showing the effects of dietary starch content on dry matter intake in lactating dairy cows.

Analysis of Starch Digestibility:

Analysis of ruminal starch digestibility, including in vitro ruminal starch digestibility, is disclosed in U.S. Pat. No. 7,550,172, entitled "Selective Feeding of Starch to Increase Milk Production In Ruminants," having at least one common inventor, David Weakley, the contents of which are incorporated herein by reference in its entirety for any useful purpose. In one example illustrating that starch content can vary across corn silage, corn silage samples were collected from across the United States from Oct. 2007 until Jun. 2010 that contained from 12 to 42 percent starch (FIG. 2B, CALIBRATE™ Technology Lab, 2010), and were shown to have an in vitro ruminal starch digestion ranging from 69 to 93 percent of starch (CALIBRATE™ Technology Lab, 2010, Gray Summit, Mo.). Furthermore, the distribution of this variation can vary across years due to differences caused by hybrid effects, growing conditions, and harvest management. This variation in ruminal starch digestion can cause differences in ruminal propionate production, which can affect energy metabolism and DMI in lactating dairy cows through mechanisms described by the Hepatic Oxidation Theory (HOT: Allen et al., 2009). A variation of this theory is demonstrated by a summary of studies conducted at the Longview Animal Nutrition Center (LANC; Gray Summit, Mo.) involving 4750 observations of cows in early and mid-lactation (FIG. 2C). From these data, the relationship between DMI and percent dietary starch in the diet was determined, taking into account days in milk (DIM) and cow parity. As observed in FIG. 2C, DMI was unaffected by dietary starch level in very early lactation with either primiparous or multiparous cows. From 30 to approximately 180 DIM, however, intake was depressed by feeding 25 percent versus 15 percent diets in either parity.

Figure 2D:
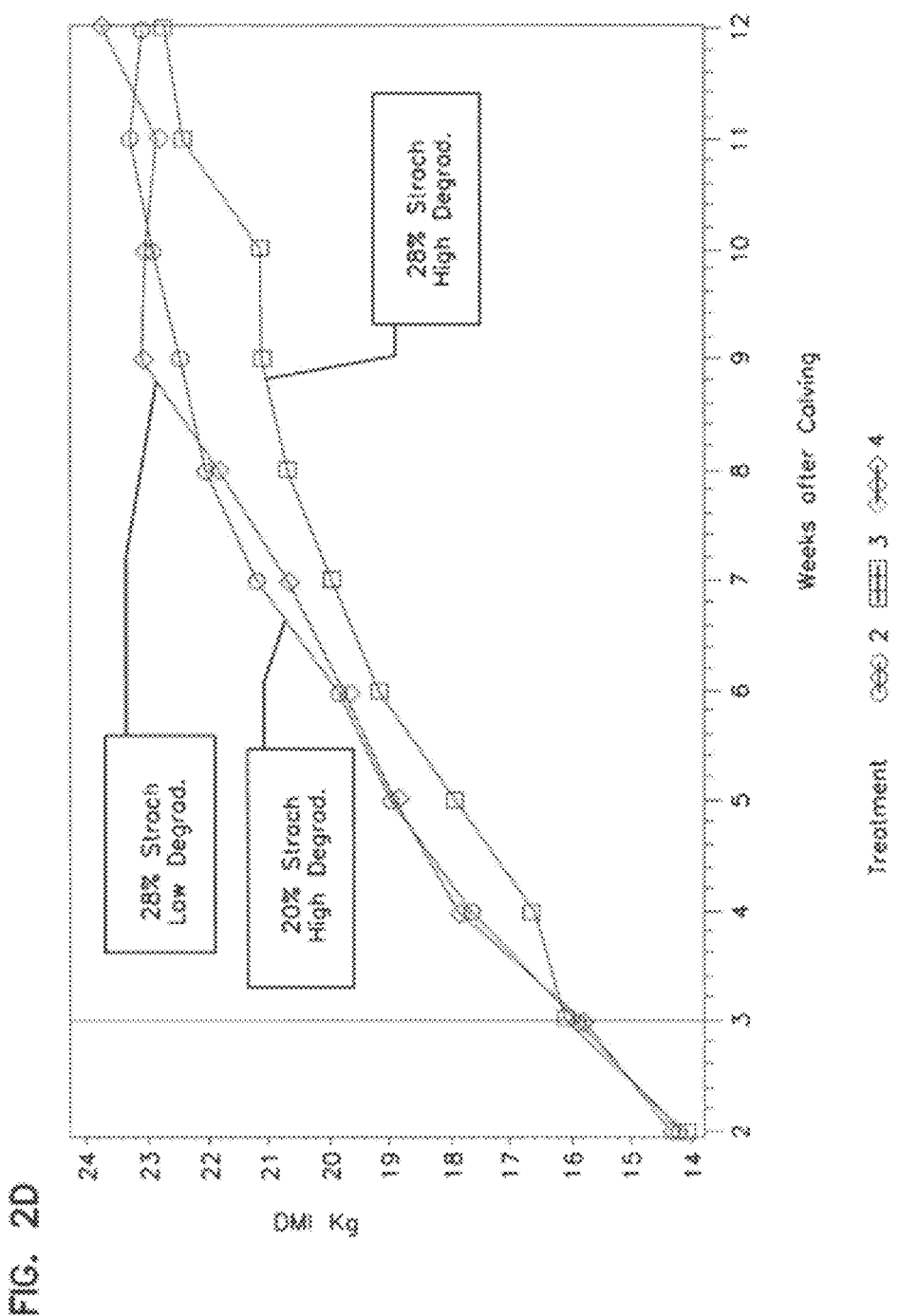
FIG. 2D is a graph showing the effects of dietary starch content on dry matter intake of lactating diary cows.
Figure 2E:
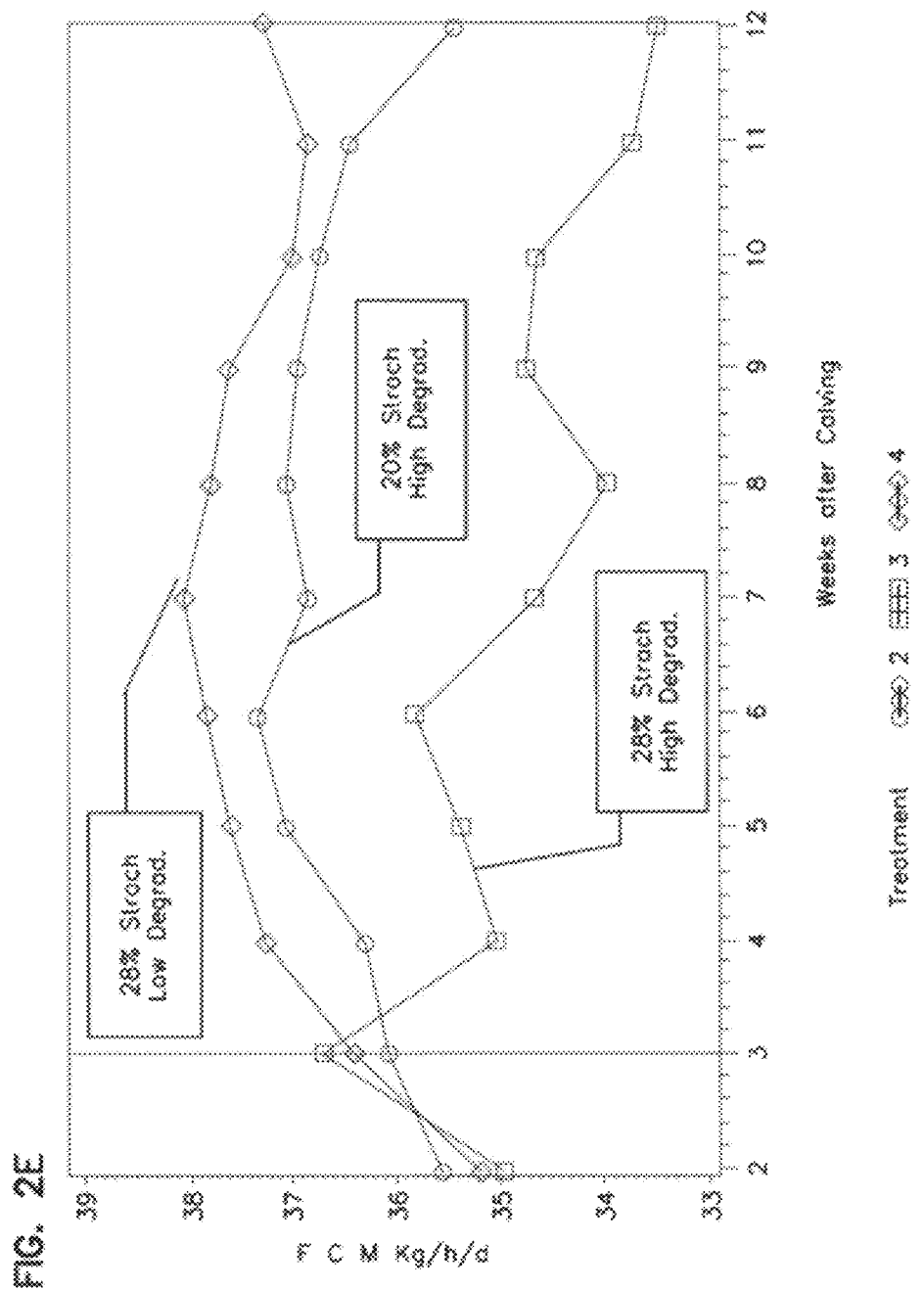
FIG. 2E is a graph showing the effects of dietary starch on fat corrected milk.

A further example of the effects of dietary starch levels and ruminal digestibility on performance can be seen in a study conducted at the LANC with early lactation cows. From week 4 through 12 of lactation, 66 cows in three treatment groups were fed diets differing in starch level and ruminal digestibility. After three weeks on a common diet, cows were changed over to either a low (20 percent) or one of two high (28 percent) starch diets. The high starch diets had either all the supplemental starch in the form of fine ground corn or a 50 percent replacement with fine ground milo (which had a lower rate of ruminal starch fermentation). When half the corn in the third treatment was replaced with milo in treatment 4, DMI was improved by 1.0 kg/d (2.2 lb/d; P<0.01; FIG. 2D) and 3.5 percent fat corrected milk (FCM) production was significantly improved by 2.6 kg/d (5.7 lb/d; P<0.01; FIG. 2E). Oba and Allen (2003) observed an 8 percent reduction in feed intake when providing corn in the diet in a more fermentable form as high moisture versus dry grain, but only on a higher starch diet. These studies support the potential for DMI and milk production depression when replacing dry corn in the diet with starch from more ruminally available sources, like high moisture corn or corn silage. Furthermore, it is apparent that controlling the consequences of variation in ruminal starch digestion by using crude starch formulation standards is inadequate. Rather, formulation standards for ruminal digestion of starch are needed.

Analysis of Fiber Digestibility:

Even utilizing in vitro analysis of starch, ruminal digestibility of fiber, e.g., NDFd, and ruminal undigested forage NDF (RUNDF) typically have not been consistently analyzed (using in vitro analysis or otherwise) nor have ruminal digestibility of NDFd and/or RUNDF been used to formulate feed rations.

However, it has been found that ruminal NDFd and RUNDF also affects feed efficiency, digestibility, intake and milk production.

A frequently quoted metric of the relationship between dietary NDF digestibility and performance in dairy cattle comes from the data summary by Oba and Allen (1999). Relating data from 13 sets of forage comparisons reported in the literature, they concluded that a one (1) percentage unit increase in neutral detergent fiber (NDF) digestibility (measured in vitro or in situ) resulted in a 0.37 lb increase in DMI and a 0.55 lb increase in fat-corrected milk. The authors further observed that the relationship was confined to animals of high production that were more likely to exhibit intake suppression from reaching bulk fill limits. A more recent further evaluation of this relationship for 11 corn silage comparisons reported in the literature showed a 0.26 lb/d increase in DMI and a 0.47 lb/d increase in 4 percent fat corrected milk per one (1) unit increase in in vitro NDF digestion (IVNDFD; Oba and Allen, 2005).

However, the increase in DMI resulting from feeding forages of higher IVNDFD can come at the cost of reduced diet digestibility and potential feed efficiency, as a consequence of reduced residence time of feedstuffs in the digestive tract. This relationship was observed in a study where 3 corn silage hybrids were fed in diets containing 40 percent corn silage with and without 3 percent wheat straw (See Study 2, Table 9). While adding wheat straw reduced the formulated diet energy density, subsequent measures of in vivo digestibility of dry matter (DM) were increased by 3 percent (P<0.05) across all 3 hybrids (Table 1). Additionally, NDF digestibility was improved (P<0.04) on the straw containing diets (Table 1). Both observations were presumably due to increased residence time of the diet in the rumen when straw was included, despite DMI not being significantly affected.

This would suggest that there may be an optimum mass of digesting NDF, above which intake is limited by bulk fill and below which intake can increase; but possibly at the expense of reduce digestion and, subsequently, feed efficiency. This is in line with the NDF-Energy Intake System recently revisited by D. R. Mertens (2009) where he suggests that there is a unique solution for dietary NDF at each milk production level at which the fill limitation and energy demand curves intersect. Each solution defines the NDF level that maximizes both DMI and maximum NDF (and forage) in the diet. Mertens (2010) further mentions that while the optimum NDF level can be fine-tuned for differences in NDF digestibility, the effect from changing crude NDF is 2 to 3 times greater than changing the digestibility of the NDF. However, one could argue that in practical situations where dietary NDF has reached maximum fill potential in high producing cows, the digestibility of the NDF can take on relatively greater importance.

For example, total tract NDF digestibility may be measured for formulating feed rations, described below. In addition, Study 1 below, illustrates the use of RUNDF as a measure of cow productivity to improve diet and NDF digestibility in ruminants.

In the rumen, a mat of RUNDF, (e.g., undigested fiber) acts as a filtering agent for ruminal contents. Below the mat, flowing fluid of undigested nutrients moves out of the rumen. A normal mat may selectively retain contents in the rumen to facilitate digestibility, feed efficiency and milk production. A relatively small mat causes fluid to move through the rumen at a fast rate, which results in a lower feed efficiency (e.g., higher intake) and lower rumen digestibility. A relatively larger mat causes fluid to move through the rumen at a slow rate, which results in higher rumen digestibility of starch, fiber and other dietary nutrients. The larger mat may also cause the ruminant to reduce feeding due to the fiber exerting much pressure against the ruminal wall. However, at higher levels of rumen digestibility, too much starch digested in the rumen may cause a shift in energy partitioning towards body fat deposition, decreased dry matter intake, and reduced NDFd, which may decrease milk production, and may even be problematic for the cow due to the potential for acidosis by over-production of propionate and other volatile fatty acids. Therefore, it should be possible to manipulate the ruminal digestion of starch and other dietary nutrients by selectively manipulating the amount of rumen undigested NDF (RUNDF) in the diet and, subsequently, rumen.

Table 1 illustrates RUNDF percent targets are more responsive than rumen digested forage (e.g., NDFd) percent targets to changes in forage quality.

TABLE 1

Rumen Undigested Forage NDF Targets

| | lbs. DM | NDF, proportion | NDFd, proportion | NDF, lbs | NDFd, lbs | RUNDF lbs |
|---|---|---|---|---|---|---|
| Average digestible assumption | | | | | | |
| Alfalfa hay | 12 | 0.45 | 0.45 | 5.4 | 2.43 | 2.97 |
| Corn silage | 15 | 0.55 | 0.55 | 8.25 | 4.5375 | 3.7125 |
| Wheat Straw | 2 | 0.85 | 0.1 | 1.7 | 0.17 | 1.53 |
| Total Forage | 29 | | | 15.35 | 7.1375 | 8.2125 |
| Total Diet | 50 | | | 30.70% | 14.28% | 16.43% |
| Low digestible assumption | | | | | | |
| Alfalfa hay | 12 | 0.5 | 0.4 | 6 | 2.4 | 3.6 |
| Corn silage | 15 | 0.6 | 0.5 | 9 | 4.5 | 4.5 |
| Wheat Straw | 2 | 0.85 | 0.1 | 1.7 | 0.17 | 1.53 |
| Total Forage | 29 | | | 16.7 | 7.07 | 9.63 |
| Total Diet | 50 | | | 33.40% | 14.14% | 19.26% |
| High digestible assumption | | | | | | |
| Alfalfa hay | 12 | 0.4 | 0.5 | 4.8 | 2.4 | 2.4 |
| Corn silage | 15 | 0.5 | 0.6 | 7.5 | 4.5 | 3 |
| Wheat Straw | 2 | 0.85 | 0.1 | 1.7 | 0.17 | 1.53 |
| Total Forage | 29 | | | 14 | 7.07 | 6.93 |
| Total Diet | 50 | | | 28.00% | 14.14% | 13.86% |

In the above examples (average, low and high digestible assumption), forage NDFd (in both lbs. and percent of DM) generally does not vary to a large extent from 7 lbs. or 14 percent of dry intake. This is because as forage digestibility increases (as a percentage of NDF), the NDF content (percentage of dry matter) typically decreases, and therefore the multiplication of the two does not change much. However, the RUNDF content (in both lbs. and percent of dry matter) ranges from 6.9 to 9.6 lbs or 13.9 percent to 19.3 percent, because as forage undigestibility increases (i.e., digestibility decreases), typically so does the NDF content (percent of DM), and therefore the multiplication of the two increases.

Moreover, RUNDF may provide information on variations in dry matter intake and digestibility changes compared to NDFd, as evidenced by the digestibility responses to adding RUNDF in the form of wheat straw in Study 1, set forth below. In Study 1, RUNDF target ranges were based on 28 hour in vitro digestibility measurements and/or in vivo measurements. However, other methods may be used to measure ruminal starch digestibility and RUNDF. For example, the ruminally digestible starch component and the RUNDF component may be based on other in vitro testing methods (such as a 48 hour in vitro digestibility measurement); by using duodenal cannulas in the ruminant; by in situ measurements of the ruminally digestible starch and NDF component in porous bags in the rumen; by spectrophotometric methods; by infrared reflectance spectroscopy; and so on. The targets may be scaled based on the testing method utilized to determine digestibility.

According to implementations provided herein, starch and/or fiber are manipulated in the diet and fed to the animal to achieve certain outcomes such as improved milk production and/or reduced costs of milk production, e.g., through cost savings in feed formulations. Improvements to milk production may generally involve the ruminant reaching a normal or increased level of dry matter intake. In some implementations, the RUNDF may be adjusted based on a desired outcome, such as increased digestibility, feed efficiency and/or reduced dry matter intake.

Methods and Computer-implemented Methods for Improving Milk Production or Reducing Feed Costs:

FIG. 3A shows a method 100 for improving milk production or reducing feed costs by manipulating the rate and the extent of digestion of starch and fiber in the rumen. The method 100 involves sampling forages and grains 110, e.g., fiber and starch sources, from a producer's farm or from the producer's available feed sources. The samples are processed 120 in a lab for analysis, and the samples are analyzed 130. Results of the analysis are provided 140 as input into a feed formulation calculator along with feeding rates of each dietary component. The feed rations may be reformulated 150 utilizing the outputs of the feed formulation calculator. After feeding the reformulated feed, milk production and dry matter intake levels are monitored 160. The monitoring information is provided for performing milk composition diagnostics 170. This process is periodically repeated, in part, due to the changes in the digestibility of the forage and grains.

In operation 110, forage and grain sources from the producer's feed supply that may be used to feed the ruminant are sampled. Examples of forage sources may include alfalfa silage, corn silage, wheat silage, sorghum silage, oat silage, grass silage, ryegrass silage, barley silage, triticale silage, grass hay, alfalfa hay, oat hay, wheat hay, barley hay, ryegrass hay, triticale hay, oat straw, wheat straw, barley straw, whole cottonseed, cottonseed hulls, beet pulp or any combination thereof. Examples of grain sources may include: corn grain, corn silage, corn gluten feed, corn germ meal, corn starch, corn byproducts, sorghum grain, sorghum silage, sorghum byproducts, milo, wheat grain, wheat silage, wheat bran, red dog wheat, wheat germ, wheat flour, wheat middlings, wheat byproducts, barley grain, barley silage, barley byproducts, oat grain, oat silage, oat byproducts, bakery byproducts, hominy feed, peas, brewers grains, distillers grains, malt sprouts, rice, rice bran, rice flour, rice byproducts, cereal feed, sucrose, lactose, glucose, dextrose, maltose, cassava, potatoes or other starchy tubers or any combination thereof.

In operation 120, the sampled forage and grain sources are prepared for analysis. For example, where the samples are prepared for NIR analysis, typical drying and processing techniques for NIR analysis may be utilized. In operation 130, the prepared samples are analyzed. For example, the samples may be analyzed through one or more of NIR analysis, infrared reflectance spectroscopy, spectrophotometric methods, other rapid testing methods, in vitro analysis, duodenal cannulas, in situ measurements (e.g., measuring ruminal digestibility using porous bags in the rumen) and in vivo analysis.

In one example, by using an in vitro analysis for operation 130, each ingredient may be analyzed to measure the starting NDF and/or starch values using chemical and enzymatic methods. The same methods are used to measure the residual NDF and starch after another set of samples are digested for 6-7 hr in vitro or 28 hr in vitro for calculation of in vitro ruminal digestion of starch and NDF, respectively. The in vitro residue amounts are compared with the initial amounts to calculate in vitro starch and NDF digestion, as a percent of their original amounts.

Based on the analysis 130, the ruminal digestibility of the starch and/or fiber fractions of the feed components are determined. In some implementations, for the fiber fraction of the feed components, the ruminally undigested NDF fraction is determined. For example, the ruminal undigested NDF fraction is the remaining fiber fraction after ruminal digestion (e.g., in vitro) or is the predicted remaining fiber fraction based on predetermined digestibility values for the same or related feed components.

In some implementations, the digestibility or the converse, undigestible values may be converted into an indexing system that has a linear relationship to the in vivo digestibility of starch and NDF based, in part, on comparing each value to the in vitro digestibility of internal standard ingredients of known in vivo digestibility (measured in animal trials). For example, for the GPN indexing system for rating starch, the GPN index ranges from 1 to 11, where 1 is representative of a starch source of low or slow ruminal digestion (e.g., ground corn) and 11 is representative of a starch source of high or fast ruminal digestion (e.g., corn in corn silage). The FPN indexing system for rating fiber includes index ranges from 60 to 200, where 60 is representative of an NDF source of low or slow ruminal digestion (e.g., ground cottonseed hulls) and 200 is representative of an NDF source of high or fast ruminal digestion (e.g., wheat silage).

In operation 140, the results of the analysis (e.g., digestibility values, undigestible fractions, spectral results or other analysis results, such as in situ testing, that are converted into starch percent and/or fiber percent, moisture content, and in some instances GPN and/or FPN numbers) for some or all of the dietary components are provided as input to a feed formulation calculator along with the dietary components and feeding rates of each dietary component. For example, in FIG. 3B, "corn silage" and "corn, fine gr." include analysis inputs of starch and fiber percentages and GPN and FPN numbers.

Utilizing the feed formulation calculator, for each feed component the pounds of dry matter in the feed formulation is multiplied by the nutrient (percent of dry matter) and by the ruminal digestion or undigested fraction. For example, for fiber, the pounds of ingredient dry matter is multiplied by the percentage of NDF and by the ruminal undigested NDF (percent of NDF). For starch, which may be in addition or as an alternative to fiber, the pounds of ingredient dry matter is multiplied by the percentage of starch and by the ruminal starch digestion (percent of starch). The ruminal digestion values may be predicted based on relationships obtained from previously analyzed samples, or may be measured directly in vitro. When both fiber and starch are used, the contributions for each nutrient are summed and expressed as pounds of ruminal starch digestion and pounds of ruminal undigested NDF digestion.

In some implementations, after the conversion of the GPN results to ruminal starch digestibility values as a percent of starch based on a linear scale, and the conversion of the FPN results to ruminal NDF digestion and undigested as a percent of NDF based on a linear scale, the formulation calculator sums the contributions of the nutrient fractions from all ingredients (e.g., all sampled ingredients).

In operation 150, the feed rations are reformulated utilizing the outputs of the feed formulation calculator. In some implementations, analysis results from operation 130 may be compared with ruminal digestibility information and target levels based on animal production results (e.g., milk production and dry matter intake) to reformulate the feed rations. The analyzed input may be compared against the ruminal digestibility information, which may include ruminal starch digestibility information and/or ruminal fiber digestibility information that may also include RUNDF information and/or total tract NDF digestibility. Utilizing RUNDF information, a rate and extent of nutrients moving past the mat may be improved. Total tract NDF digestibility can be used as an additional or an alternative method. In other implementations, the summed amounts of the pounds of ruminal starch digestion and/or ruminal undigested NDF may be compared to the dietary targets, and the feed component amounts are adjusted or reformulated to the dietary targets for improving dry matter intake, feed efficiency, yield of milk components or combinations. For example, in FIG. 3B, the reformulated diet (proposed) provides a lower starch and higher NDF recommendation based on the diet inputs (current), but at a reduced feed cost. In another example, a target ruminally digestible NDF or RUNDF value may be obtained in the reformulated feed ration by combining two or more feed components having differing ruminal fiber digestibilities. The target ruminal digestible NDF or RUNDF value may be achieved by including fiber carbohydrates, structural carbohydrates, insoluble carbohydrates, or insoluble fiber, forage NDF sources or any combination thereof.

In operation 160, milk production and dry matter intake levels are monitored after feeding the reformulated feed to the lactating dairy cow. In operation 170, milk composition diagnostics are performed based on monitored milk production levels. The diagnostics may involve reformulating the feed ration to increase milk production and/or to decrease tissue energy deposition, and/or increase dry matter intake for example. If dry matter intake, yield of components or both are not at desired levels, then method 100 may return to operation 150 for reformulation.

This process may be periodically repeated, in part, due to the changes in the digestibility of the forage and grains. The process may also be periodically repeated, in part, due to the changes in the particle size of the forage and grain components as this will affect surface area presented to microbes for subsequent digestion in the rumen. The process may be repeated every 2-4 weeks, 1-2 weeks, 4 weeks, and so on, to account for changes in available starch and fiber in the feed components. For example, the amount of available starch in ensiled forage sources such as silage changes over time. FIG. 3C illustrates two feed rations with the same lbs. of corn silage as fed, but one silage contains an increase in starch (e.g., 40 percent starch silage, middle column), which can depress dry matter intake and milk fat due to increased ruminal starch digestion than desired (e.g., percent of starch dig. target is 108, meaning ruminal digestibility exceeds the target by about 8 percent). Therefore, tracking changes in the starch content and digestibility of the feed sources is needed periodically to account for these changes.

In view of the foregoing, some or all of the operations of method 100 may be implemented on a computer. For example, the analysis of the samples in operation 130 may be performed using a computerized analysis device, and the results may be utilized as input in operation 140 for the feed formulation calculator. The feed formulation calculator may be embodied in software and/or hardware, and a computer processor may execute instructions for receiving and analyzing the input and reformulating the feed ration in operation 150 based on the received and analyzed data.

Figure 4:
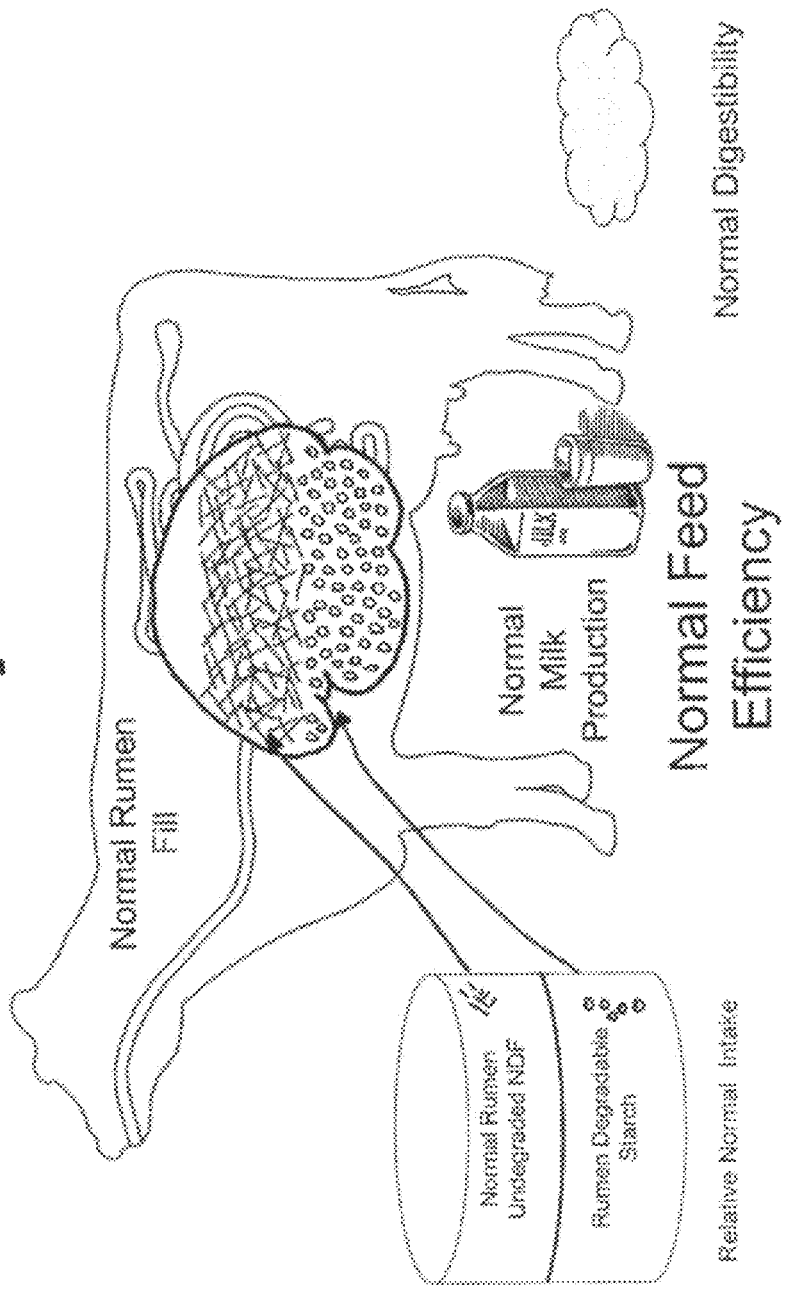
FIGS. 4-6 show diagrams of a starch and NDF diet formulated to provide RUNDF levels to support desired milk production, feed intake, feed efficiency and digestibility levels, according to the present disclosure.

In certain implementations, the method 100 may be utilized to obtain a target intake and digestibility for normal milk production. FIG. 4 shows a diagram of a starch and fiber diet formulated according to the present disclosure, which provides RUNDF levels to support a normal milk production with a normal feed intake, normal feed efficiency and normal digestibility. In FIG. 4, the fiber mat of a normal size in the rumen promotes retention of the starch component and therefore ruminal digestion of the starch to maintain a normal milk production. Generally, normal milk production is understood as a range of milk production at a given point in the lactation cycle of a lactating dairy cow. This targeted level of RUNDF and ruminal starch digestion represents the combination of dry matter intake and digestibility to maximize energy intake with acceptable feed efficiency. For example, normal levels of 3.5 percent fat corrected milk production from 3 to 12 weeks of lactation are expected to be in a range of 70 to 90 lbs. Because the ruminal digestibility of each component is known due to the analysis described in the method 100, the ratio of the components fed to the cow may be manipulated to achieve normal milk production.

In method 100, the reformulated amounts fed to the cow may promote retention of the fiber and starch in the rumen for a normal period of time, in part, based on the normal sized mat within the rumen. Although the mat within the rumen (composed of fiber, including NDF, alfalfa hay, wheat straw and so on) eventually moves out of the rumen and is excreted, the method 100 takes into account the feeding rate of the cow and therefore calculates the amount of RUNDF and other fiber components in the rumen at a given time based on the feeding rate. Therefore, the recommended fiber and starch levels provided in the method 100 may also be expressed in rumen digestible starch and RUNDF levels. For example, to produce a normal amount of milk in the ruminant, a normal amount of ruminally digestible starch may be 12 to 20 weight percent in relation to the dry matter of the feed and a RUNDF level may be in the approximate range of 8 to 13 weight percent in relation to the dry matter of the feed. However, the recommended starch and fiber amounts may simply be expressed as pounds of fiber and pounds of starch in the feed ration, with RUNDF levels taken in to account as part of the fiber recommendation.

Figure 5:
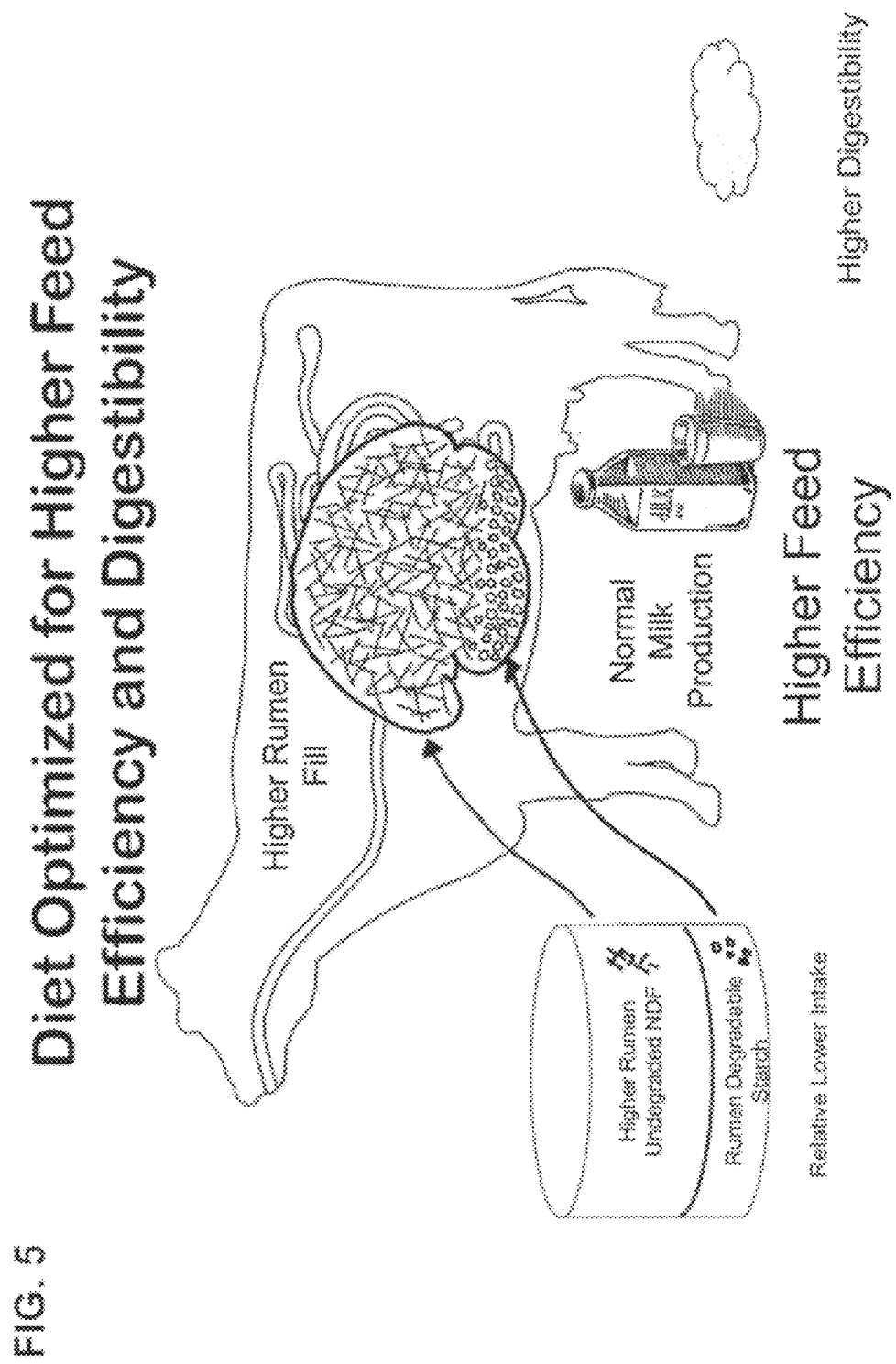

Increasing RUNDF to Obtain Higher Feed Efficiency and Digestibility with Similar Milk Production and DMI Using Method 100:

In some implementations, the method 100 may be utilized to increase RUNDF levels to obtain a higher feed efficiency and digestibility, but at similar milk production and lower dry matter intake. FIG. 5 shows a diagram of a starch and fiber diet formulated according to the present disclosure, which provides RUNDF levels to support a normal milk production with a reduced feed intake and higher digestibility, and subsequently higher feed efficiency. In FIG. 5, the fiber mat is larger to promote retention of the starch component in the rumen relatively longer than the normal sized mat of FIG. 4.

For example, a normal amount of ruminally digestible starch may be 12 to 20 weight percent of ruminally digestible starch component in relation to the dry matter of the feed and a ruminally undigested forage NDF may be in the approximate range of 8 to 13 weight percent of ruminally undigested forage NDF component in relation to the dry matter of the feed. In the implementation of FIG. 5, the ruminally digestible starch may be 12 to 20 weight percent of ruminally digestible starch component in relation to the dry matter of the feed, while the ruminally undigested forage NDF may be in the approximate range of 10 to 15 weight percent of ruminally undigested forage NDF component in relation to the dry matter of the feed.

Because the starch component of the ruminant diet is maintained in the rumen for a longer period of time by the added amount of ruminally undigested forage NDF, the ruminal digestibility of the starch increases, thereby promoting propionate production and thus milk production. Thus, in some implementations, the amount of starch fed to the animal may be relatively reduced compared to normal amounts, and the increased digestibility of the starch in the rumen promotes a normal milk production as a result of increasing the RUNDF amount or percent. As explained above, because the method 100 takes into account the feeding rate of the cow, in the example of FIG. 5, the amount of RUNDF and other fiber components in the rumen at a given time may be increased based on the feeding rate. This increased fiber level in comparison to the starch level may also be expressed as a RUNDF level, or the RUNDF level may be taken into account as part of the fiber recommendation in the fiber and starch feed amounts.

The implementation of FIG. 5 may be useful where cost savings is targeted. For example, in some markets, corn grain may be an expensive feed component. Reducing the corn grain in the diet, while maintaining milk production at a normal level by replacing corn grain with starch sources of higher ruminal digestion and lower cost, can result in a more profitable milk production operation by reducing the price of the lactating dairy cow's diet.

The implementation of FIG. 5 may also be useful where the producer has limited available resources (e.g., feed components such as corn grain) on hand. For example, the region the producer is situated may affect the availability of certain resources. In the Southwest region of the US, corn grain may not be readily available or may be difficult to grow. Utilizing method 100, the available resources may be evaluated to determine a level of starch and fiber that achieves normal milk production at a reduced starch level. The feeding system of FIG. 5 was implemented in Study 2, provided below.

Figure 6:
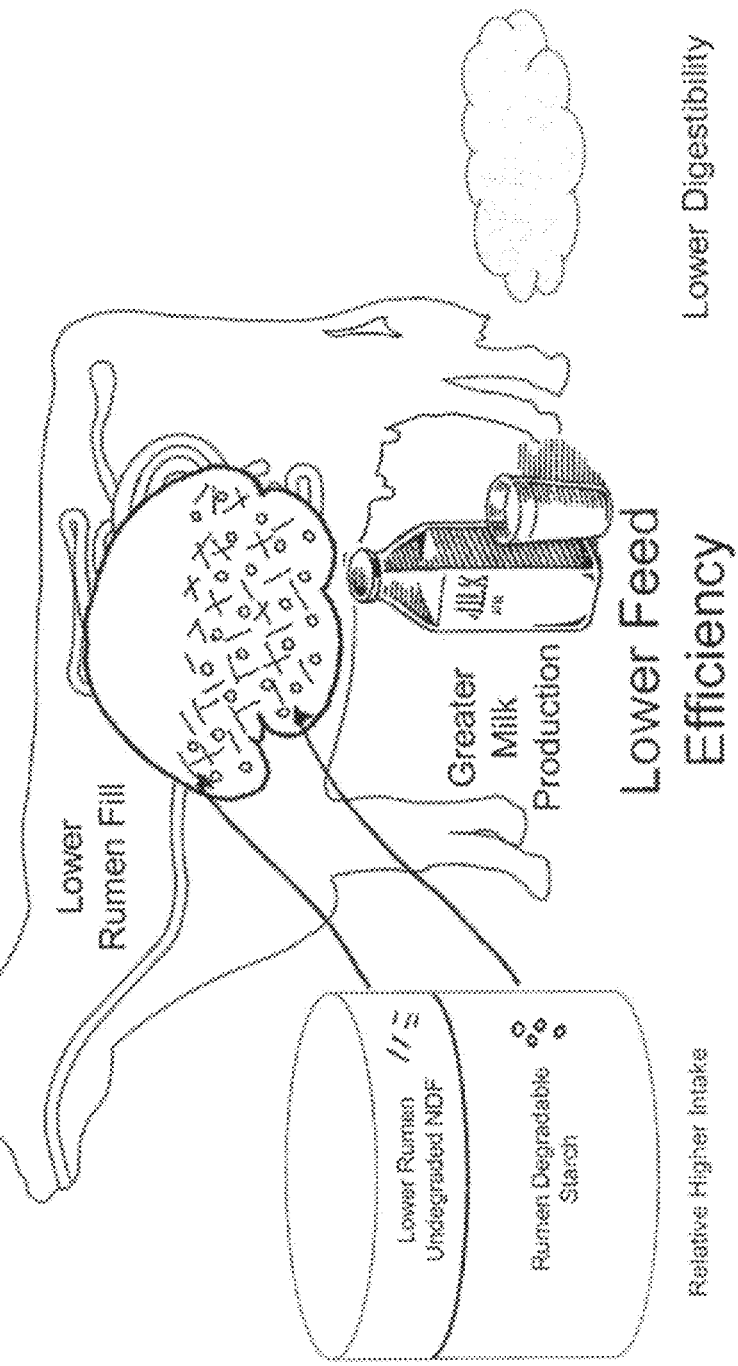

Decreasing RUNDF to Obtain a Higher Dry Matter Intake and Milk Production Using Method 100:

In some implementations, the method 100 may be utilized to decrease RUNDF to obtain a higher dry matter intake and yield higher milk production. FIG. 6 shows a diagram of a starch and fiber diet formulated according to the present disclosure, which provides RUNDF levels to support increased milk production with an increased feed intake but lower digestibility. This example, may yield higher milk production, but at a higher feed cost and lower feed efficiency.

In FIG. 6, the fiber mat is smaller to promote movement of the increased starch and other nutrient components through the rumen at a relatively fast rate. For example, compared to the normal amounts of ruminally digestible starch (e.g., 12 to 20 weight percent in relation to dry matter of feed) and normal amounts of ruminally undigested forage NDF (e.g., 8 to 13 weight percent in relation to dry matter of feed), in the example of FIG. 6, the ruminally digestible starch may be 10-18 weight percent of ruminally digestible starch component in relation to the dry matter of the feed, while the forage RUNDF may be in the approximate range of 6 to 11 weight percent of ruminally undigested forage NDF component in relation to the dry matter of the feed. The reduced amount of forage RUNDF may cause the starch and other nutrients to move through the rumen more quickly, and may also increase feed intake providing more starch and other nutrients from the diet to increase milk production.

As explained above, because the method 100 takes into account the feeding rate of the cow, in the example of FIG. 6, the amount of RUNDF and other fiber components in the rumen at a given time may be lowered based on the feeding rate. This lowered fiber level in comparison to the starch level may also be expressed as a RUNDF level, or the RUNDF level may be taken into account as part of the fiber recommendation in the fiber and starch feed levels or amounts.

The example of FIG. 6 may be useful where the producer has a large amount of starch containing feed components available and/or a large amount of fiber containing components available. In addition or alternatively, the producer may target increased milk production, which may cause an increase in feed costs, for example, in situations where the market for feed is low (e.g., low priced) and/or the price for milk is high (e.g., increased payments to producer per lb. of fat corrected milk). The feeding system of FIG. 6 was implemented in Study 3, provided below.

In addition, the feeding systems of FIGS. 4-6 were implemented in Study 1 below.

Reducing the Cost of Feed while Maintaining Milk Production at a Desired Level Using Method 100:

In another implementation, the method 100 utilizes information on the cost of the feed components to reduce the feed costs while maintaining milk production at a desired level. The publication entitled "Increasing Silage Levels in Dairy Diets Using Starch and NDF Digestibility Data," by inventor David Weakley, provides disclosure on increasing silage in the diet to reduce feed costs in the section entitled "A Method for Optimizing High Corn Silage Diets." *Weakley*, D.C. 2011. Increasing silage levels in dairy diets using starch and NDF digestibility data. Proceedings of Mid-South Ruminant Nutrition Conference. Texas Animal Nutrition Council. p. 19-24 (published Apr. 21, 2011). FIG. 3B shows a screen shot of a feed ration calculator utilized to reduce feed costs by substituting high cost feed ingredients with low cost feed ingredients, according to the present disclosure. In this implementation, any of the feeding systems described above in connection with FIGS. 4-6 may be utilized to improve milk production, while at the same time, reducing feed costs from a starting feed ration. FIG. 8 shows a cost calculation for a feed formulation utilizing the method 100 with a target for a reduced amount of corn grain (corn, fine ground) and therefore a reduced cost. FIG. 3C, at the right column, shows a cost calculation for a feed formulation utilizing method 100 with a target for ruminal starch digestibility (e.g., percent of Starch dig. target is at 100, indicating achievement of the desired ruminal digestibility) and a reduced cost. In some implementations, the producer and/or nutritionist may request that all corn grain in the ruminant diet be replaced with other feed components, such as silage. In this case, the corn grain component of the feed ration calculator may be removed as an input, and the feed ration calculator may utilize forage, byproducts, protein supplements and the like in reformulating the diet to be fed to the rumen. In further implementations, the producer or nutritionist may have achieved a normal milk production and desires to reduce feed costs while maintaining normal milk production. In this case, the feed ration calculator may recommend the same or similar starch and fiber amounts, but may recommend different, less expensive, feed components (e.g., recommend corn silage instead of corn grain).

Figure 7:
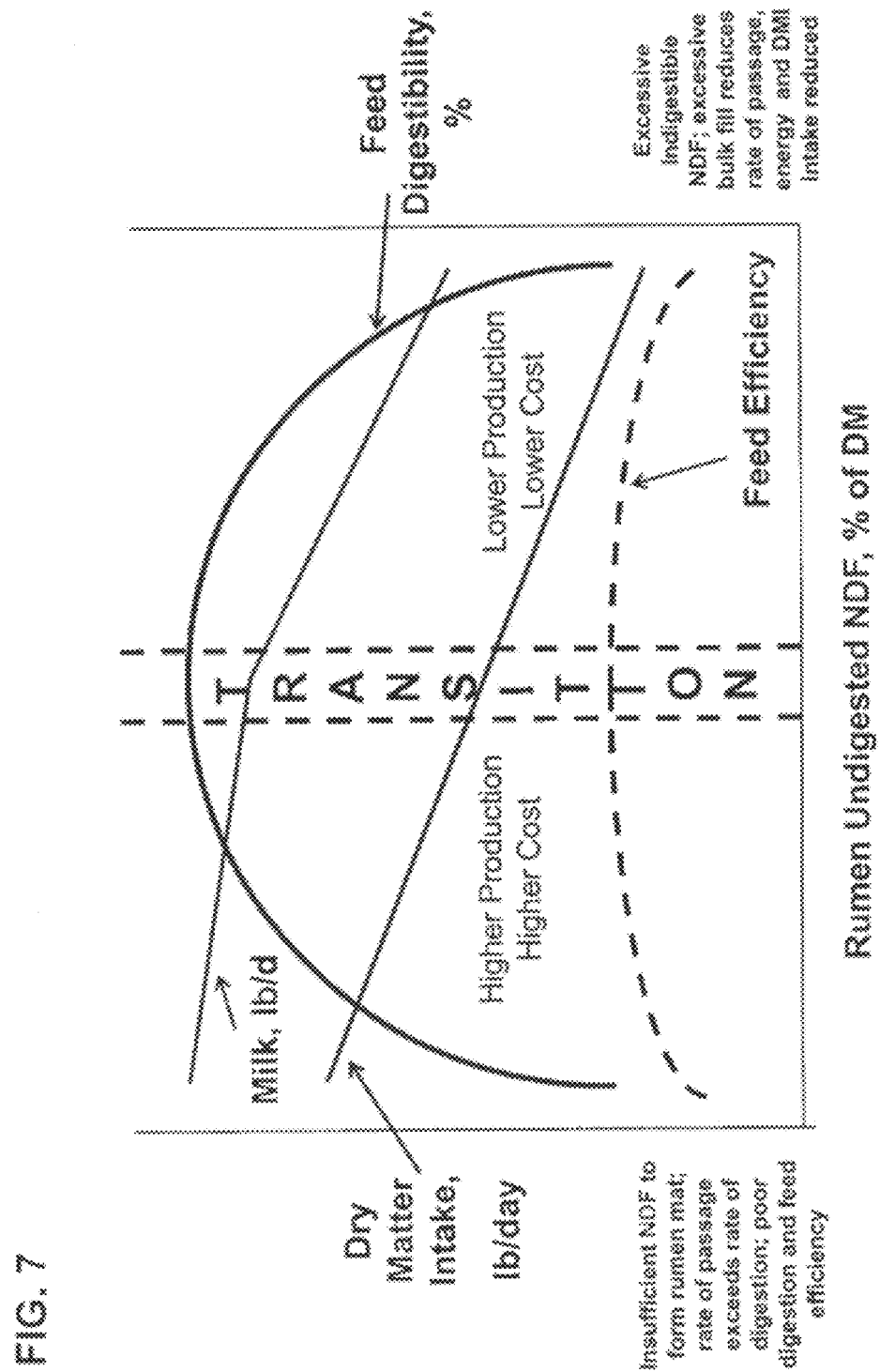
FIG. 7 shows a graph illustrating ruminal NDF digestibility that may be utilized to improve milk production, digestibility and/or feed efficiency, according to the present disclosure.

FIG. 7 shows a graph illustrating ruminal NDF digestibility that may be utilized to improve milk production and/or feed efficiency, according to the present disclosure. According to the far left side of FIG. 7, where an insufficient amount of rumen undigested NDF is in the animal's diet, a rumen mat is not sufficiently formed and the rate of passage exceeds the rate of digestion, which results in poor digestion and feed efficiency. According to the middle portion of FIG. 7, the NDF forms a mat in the rumen that enables the starch and fiber components to be digested in the rumen for improved milk production. The transition zone represents the combination of feed digestibility and intake to maximize energy intake with acceptable feed efficiency. The area within and to the left side of the transition zone may be targeted for improving milk production (e.g., for reaching a normal and/or increased milk production). According to the right portion of FIG. 7, the NDF forms an excessively large mat in the rumen, causing excessive bulk fill reducing the rate of passage and resulting in a reduced dry matter intake, but increased digestibility and feed efficiency. The implementations of FIGS. 4-6 provided above provide feed rations of starch and fiber components that target the transition zone area and left side of the graph in order to improve milk production.

EXAMPLES

A number of methods may manipulate starch and/or fiber in the ruminant diet to adjust the rate and/or extent of ruminal digestibility of these components to achieve various outcomes. Each of the methods described below may be implemented in connection with method 100 described above.

In a first example, milk production and/or milk components may be improved in a ruminant by simultaneously manipulating a diet of an amount of a ruminally digestible starch and ruminally undigested forage neutral detergent fiber (NDF) component in relation to the dry matter of a feed, and feeding the manipulated diet to the ruminant. In this first example, the selected ratio for ruminally digestible starch may be in the approximate range of 12 to 20 weight percent of ruminally digestible starch component in relation to the dry matter of the feed, and the selected ratio for ruminally undigested forage NDF may be in the approximate range of 8 to 13 weight percent of ruminally undigested forage NDF component in relation to the dry matter of the feed.

In a second example, dry matter intake and energy intake may be increased in a ruminant by simultaneously manipulating a diet of an amount of a ruminally digestible starch and ruminally undigested forage neutral detergent fiber (NDF) component in relation to the dry matter of a feed, and feeding the manipulated diet to the ruminant. In this second example, to increase dry matter intake and energy intake, the selected ratio for ruminally digestible starch may be in the approximate range of 10-18 weight percent of ruminally digestible starch component in relation to the dry matter of the feed, and the selected ratio for ruminally undigested forage NDF may be in the approximate range of 6 to 11 weight percent of ruminally undigested forage NDF component in relation to the dry matter of the feed.

In a third example, feed efficiency and digestibility in a ruminant may be increased by simultaneously manipulating a diet of an amount of a ruminally digestible starch and ruminally undigested forage neutral detergent fiber (NDF) component in relation to the dry matter of a feed, and feeding the manipulated diet to the ruminant. In this third example, the selected ratio for ruminally digestible starch may be in the approximate range of 12 to 20 weight percent of ruminally digestible starch component in relation to the dry matter of the feed, and the selected ratio for ruminally undigested forage NDF may be in the approximate range of 10 to 15 weight percent of ruminally undigested forage NDF component in relation to the dry matter of the feed.

In a fourth example, dietary energy density may be increased in a ruminant by simultaneously manipulating a diet of an amount of a ruminally digestible starch and ruminally undigested forage neutral detergent fiber (NDF) component in relation to the dry matter of a feed, and feeding the manipulated diet to the ruminant. In this fourth example, dietary energy density may be increased by substituting low energy dense ingredients (e.g., high fiber byproducts (e.g., soy hulls, corn gluten feed, beet pulp, or other high fiber byproducts), alfalfa hay and wheat straw) with higher energy dense ingredients (e.g., starchy grains (e.g., milo, barley, wheat or other starchy grains), corn grain and fats) while maintaining the selected ratio for ruminally digestible starch in the approximate range of 14-22 weight percent of ruminally digestible starch component in relation to the dry matter of the feed, and the selected ratio for ruminally undigested forage NDF in the approximate range of 8-13 weight percent of ruminally undigested forage NDF component in relation to the dry matter of the feed.

In a fifth example, feed costs may be reduced for a ruminant by simultaneously manipulating in a diet an amount of a ruminally digestible starch and ruminally undigested forage neutral detergent fiber (NDF) component in relation to the dry matter of a feed, and feeding the manipulated diet to the ruminant. In this fifth example, feed costs may be reduced by substituting high cost ingredients (both starch and fiber components) with low cost ingredients (such as silage) while maintaining the selected ratio for ruminally digestible starch in the approximate range of 12 to 20 weight percent of ruminally digestible starch component in relation to the dry matter of the feed, and the selected ratio for ruminally undigested forage NDF in the approximate range of 8-13 weight percent of ruminally undigested forage NDF component in relation to the dry matter of the feed.

In a sixth example, ingredients and amounts to include in the diet in a ruminant may be selected by simultaneously manipulating in a diet an amount of a ruminally digestible starch and ruminally undigested forage neutral detergent fiber (NDF) component in relation to the dry matter of a feed, and feeding the manipulated diet to the ruminant. In this sixth example, to select ingredients and amounts to include in the diet may involve substituting purchased ingredients (both starch and fiber components) with home grown ingredients while maintaining the selected ratio for ruminally digestible starch in the approximate range of 12 to 20 weight percent of ruminally digestible starch component in relation to the dry matter of the feed, and the selected ratio for ruminally undigested forage NDF in the approximate range of 10 to 18 weight percent of ruminally undigested forage NDF component in relation to the dry matter of the feed.

Each of the six examples above may further involve analyzing milk from the ruminant for milk fat content and milk protein content, and increasing the amount of the ruminally digestible starch component if the milk fat content is high and the milk protein content is low. In addition or alternatively, milk from the ruminant may be analyzed for milk fat content and milk protein content, the amount of ruminally digestible starch may be decreased if the milk fat content is low and the milk protein content is high. In addition or alternatively, rumen digestibility of the ruminally digestible starch component and the ruminally digested forage NDF component (or its remaining undigested forage NDF component) may be measured in vitro. In addition or alternatively, the ruminally digestible starch component and the ruminally digested forage NDF component (or its remaining undigested forage NDF component) may be selected based on predetermined digestibility values. In addition or alternatively, the rumen digestibility of the ruminally digestible starch component and the ruminally digested forage NDF component (or its remaining undigested forage NDF component) may be measured via duodenal cannulas in the ruminant. In addition or alternatively, the rumen digestibility of the ruminally digestible starch component and the ruminally digested forage NDF component (or its remaining undigested forage NDF component) may be measured by in situ measurements of the ruminally digestible starch component in porous bags in the rumen. In addition or alternatively, the rumen digestibility of the ruminally digestible starch component and the ruminally digested forage NDF component (or its remaining undigested forage NDF component) may be measured by spectrophotometric methods. In addition or alternatively, the rumen digestibility of the ruminally digestible starch component and the ruminally digested forage NDF component (or its remaining undigested forage NDF component) may be measured by infrared reflectance spectroscopy.

The ruminally digestible starch component of the feed may be provided as corn grain, corn silage, corn gluten feed, corn germ meal, corn starch, corn byproducts, sorghum grain, sorghum silage, sorghum byproducts, milo, wheat grain, wheat silage, wheat bran, red dog wheat, wheat germ, wheat flour, wheat middlings, wheat byproducts, barley grain, barley silage, barley byproducts, oat grain, oat silage, oat byproducts, bakery byproducts, hominy feed, peas, brewers grains, distillers grains, malt sprouts, rice, rice bran, rice flour, rice byproducts, cereal feed, sucrose, lactose, glucose, dextrose, maltose, cassaya, potatoes or other starchy tubers or any combination thereof.

The ruminally undigested forage NDF component of the feed may be provided as alfalfa silage, corn silage, wheat silage, sorghum silage, oat silage, grass silage, ryegrass silage, barley silage, triticale silage, grass hay, alfalfa hay, oat hay, wheat hay, barley hay, ryegrass hay, triticale hay, oat straw, wheat straw, barley straw, whole cottonseed, cottonseed hulls, beet pulp or any combination thereof.

The selected ratio of the ruminally digestible starch component and the ruminally undigested forage NDF component may be obtained by combining starch and forage NDF ingredients having different rumen digestibilities. For example, the ruminally digestible starch component and the ruminally undigested forage NDF component may be processed to achieve the selected level. Processing may be by grinding, chopping, steam flaking, steam rolling, extrusion and/or chemically or physically treating the starch and/or NDF components to modify ruminal digestibility or any other known method of treatment. Chemically or physically treating the starch or fiber components may include but is not limited to aldehyde treatment, treatment with bases or acids, alkaline peroxide, heat treatments, resins, binders or coatings.

In addition, a ruminally digestible starch component ratio may be achieved by including non-fiber carbohydrates, non-structural carbohydrates, soluble carbohydrates, or soluble fiber, or any combination thereof. In addition or alternatively, the ruminally undigested forage NDF component ratio may be achieved by including fiber containing carbohydrates, structural carbohydrates, insoluble carbohydrates, or insoluble fiber, or any combination thereof.

Studies:

Study 1: The following study examined the influence of six different levels of rumen undigested forage NDF (RUNDF) (by varying ratios of alfalfa hay and wheat straw) on total tract digestibility, energy balance, nitrogen balance and milk component yield in post-peak lactating cows consuming 45 percent forage diets containing 10 percent corn silage, 11.3 percent metabolizable protein and 23 percent starch.

With the increased interest in using forages of high fiber digestibility in feeding programs for lactating dairy cows, more information is needed on how different levels of digestible NDF affect nutrient digestibility, milk component yield and metabolism. The hypothesis is that different amounts of rumen undigested forage NDF residue in the rumen will influence ruminal nutrient transit rates and subsequent digestion. This, in turn, would influence performance or feed efficiency or both. Since there is normally an interaction between ruminal starch and fiber digestibility, starch levels may shift the optimum indigestible forage NDF targets for either intake or feed efficiency.

The study diets were formulated to six different rumen undigested forage NDF (RUNDF) levels by varying the level and proportions of alfalfa hay and wheat straw in diets containing 23 percent starch and 10 percent corn silage. The six different RUNDF values were calculated from average tabular values of NDF and 28 hour in vitro NDF digestibility measurements for each forage type.

Materials and Methods: Twenty-four Holstein cows were subjected to six treatments in two, three-week periods of feeding in the total collection area of the Large Animal Metabolism Unit (LAMU). Cows were weighed prior to entering the LAMU. There were four cows per treatment, with a minimum of three multiparous animals per treatment, fed over two periods (with two cows/treatment/period). Cows were between 100 and 250 DIM at the start of the study. Cows were blocked according to production and parity before assigning to treatments in both periods. Treatments were balanced across the two periods of feeding.

Tables 2-4 below provide a listing of the composition of the diets of Study 1 and Table 5 provides results of Study 1.

TABLE 2

Study 1

| | Alfalfa Hay | Wheat Straw | Undig. NDF, % DM | Starch, % DM | ME, mcal/lb |
|---|---|---|---|---|---|
| 1 | 35 | 0 | 9.9 | 23 | 1.29 |
| 2 | 32 | 3 | 11.5 | 23 | 1.28 |
| 3 | 29 | 6 | 13.2 | 23 | 1.28 |
| 4 | 26 | 9 | 14.8 | 23 | 1.28 |
| 5 | 23 | 12 | 16.5 | 23 | 1.28 |
| 6 | 20 | 15 | 18.2 | 23 | 1.28 |

TABLE 3

Rations for Diets of Field Study 1

| | Treatment: | | | | | |
|---|---|---|---|---|---|---|
| | 1 | 2 | 3 | 4 | 5 | 6 |
| | % of Diet DM | | | | | |
| Ration A | 55 | | | | | |
| Ration B | | 55 | | | | |
| Ration C | | | 55 | | | |
| Ration D | | | | 55 | | |
| Ration E | | | | | 55 | |
| Ration F | | | | | | 55 |
| Alfalfa Hay | 35 | 32 | 29 | 26 | 23 | 20 |
| Wheat Straw | 0 | 3 | 6 | 9 | 12 | 15 |
| Corn Silage | 10 | 10 | 10 | 10 | 10 | 10 |

TABLE 4

Field Study 1 Percent composition of grain rations

| | Ration A | Ration B | Ration C | Ration D | Ration E | Ration F |
|---|---|---|---|---|---|---|
| Gr Corn Fine | 48.1 | 48.1 | 48.5 | 48.7 | 48.8 | 49.0 |
| Gluten Meal 60 | 6.0 | 6.2 | 6.3 | 5.9 | 6.0 | 4.1 |
| Gr Soybean Hulls | 39.8 | 39.4 | 37.4 | 34.0 | 31.9 | 27.4 |
| Dehulled Soymeal | | | | 6.5 | 7.6 | 14.0 |
| Surepro | 2.0 | 2.3 | 2.9 | | | |
| Macro and Micro Nutrients | 4.1 | 4.0 | 4.9 | 4.9 | 5.7 | 5.5 |

TABLE 5

Influence of Six Different Levels of Indigestible Forage NDF (by varying ratios of alfalfa hay and wheat straw)

| % Straw | 0% | 3% | 6% | 9% | 12% | 15% | SE | (1) | (2) | (3) | (4) | (5) |
|---|---|---|---|---|---|---|---|---|---|---|---|---|
| Milk, kg/d | 33.6 | 35.3 | 33.8 | 36.3 | 31.2 | 33.2 | 1.94 | — | — | — | — | — |
| F.C.M, kg/d | 26.4$^a$ | 31.2$^b$ | 29.9$^{ab}$ | 30.4$^{ab}$ | 27.8$^{ab}$ | 27.6$^{ab}$ | 1.40 | .17 | — | .03 | .15 | — |
| % Milk Fat (IR) | 2.62$^a$ | 3.27$^b$ | 3.24$^b$ | 2.93$^{ab}$ | 3.28$^b$ | 2.89$^{ab}$ | 0.194 | .15 | — | .06 | — | .17 |
| Fat, kg/d | 0.87$^a$ | 1.14$^c$ | 1.10$^{bc}$ | 1.06$^{bc}$ | 1.02$^{abc}$ | 0.95$^{ab}$ | 0.0615 | .07 | — | .01 | .10 | — |
| DMI, % of Body Weight | 3.82 | 3.77 | 3.66 | 3.64 | 3.45 | 3.44 | 0.131 | — | .02 | — | — | — |
| DM Digested % of Int | 65.1$^b$ | 62.4$^a$ | 66.0$^b$ | 66.0$^b$ | 66.3$^b$ | 66.1$^b$ | 0.876 | .05 | .04 | — | .09 | .09 |
| Org Matter Dig % of Int | 67.3$^{ab}$ | 64.7$^a$ | 68.0$^b$ | 68.3$^b$ | 68.6$^b$ | 68.2$^b$ | 0.964 | .11 | .06 | — | .10 | .19 |

TABLE 5-continued

Influence of Six Different Levels of Indigestible Forage
NDF (by varying ratios of alfalfa hay and wheat straw)

| % Straw | 0% | 3% | 6% | 9% | 12% | 15% | SE | (1) | (2) | (3) | (4) | (5) |
|---|---|---|---|---|---|---|---|---|---|---|---|---|
| N Digested % of Intake | $63.0^b$ | $59.1^a$ | $63.8^{bc}$ | $64.2^{bc}$ | $65.3^{bc}$ | $66.6^c$ | 0.988 | .01 | .01 | — | .06 | .04 |
| Dig Energy % of Intake | $65.2^{ab}$ | $62.5^a$ | $65.8^b$ | $66.2^b$ | $66.8^b$ | $66.4^b$ | 0.974 | .07 | .03 | — | .07 | — |
| Dig Energy, MCal/kg DM | $2.83^{ab}$ | $2.71^a$ | $2.87^b$ | $2.88^b$ | $2.93^b$ | $2.93^b$ | 0.0435 | .02 | .01 | — | .07 | .17 |
| Fat Dig. (EE) % of Int | $74.3^a$ | $73.7^a$ | $81.8^b$ | $80.8^b$ | $83.6^b$ | $82.9^b$ | 1.91 | .01 | .01 | — | — | .18 |
| NDF Digested % of Int | $46.6^a$ | $47.9^{ab}$ | $53.0^c$ | $52.1^{bc}$ | $51.1^{bc}$ | $49.3^{abc}$ | 1.48 | .05 | .09 | .01 | — | — |
| Hemicell Dig. % of Int | $53.4^a$ | $59.5^b$ | $65.0^b$ | $61.7^b$ | $63.8^b$ | $61.1^b$ | 1.84 | .01 | .01 | .01 | — | — |

PR > F if <.20 for
(1) TRT
(2) Linear
(3) Quadratic
(4) Cubic
(5) Deviation from Cubic
Means in the same row not followed by a common letter differ(P < .05) using LSD procedure.

Discussion: There was a quadratic relationship between increasing inclusions of wheat straw in the diets and 3.5 percent fat corrected milk production (P<0.03), as well as percent milk fat (P<0.06), milk fat yield (P<0.01), and milk energy as a percent of metabolizable energy (P<0.06) with highest productivity occurring with the diets containing 3 to 9 percent wheat straw. As the wheat straw level in the diet increased, there was a linear decrease in DM intake as a percent of body weight (P<0.02), and there was a linear improvement in the digestibility of dry matter (DM; P<0.04), organic matter (OM; P<0.06), protein nitrogen (N; P<0.01), digestible energy (DE; P<0.01), metabolizable energy (ME; P<0.01) and fat digestion (P<0.01). There was a quadratic relationship between increasing inclusions of wheat straw in the diets and digestibility of NDF (P<0.01) and hemicellulose (P<0.01) with higher levels occurring with diets containing 6-12 percent wheat straw.

Summary: These results indicate that increasing the formulated rumen undigested forage NDF (RUNDF) level in the diet for dairy cows, by increasing the level of wheat straw, increases the digestibility of energy yielding nutrients and the energy density of the diet, while decreasing the intake of the diet. This is presumably the result of increased residence time of energy yielding nutrients in the rumen, allowing for more complete digestion. This resulted in a quadratic effect on milk performance measurements, with the highest productivity occurring with the diets containing 3 to 9 percent wheat straw, which correlates to formulated RUNDF levels of about 11.5 to about 14.8 percent of DM intake. The reason for the quadratic correlation is the likely competing relationship between increasing nutrient digestibility and decreasing intake of the diet as the RUNDF level of the diet was increased with increasing inclusion of wheat straw. While there was also a quadratic effect between wheat straw inclusion in the diet and total tract NDF digestibility (percent of NDF), when the undigested NDF fraction was expressed as a percent of DM intake, the resulting values (percent of DM) were all very similar (21-22 percent of DM intake) demonstrating that total tract undigested NDF is a poorer indicator of performance measurements in dairy cows as compared to rumen undigested NDF (RUNDF). Accordingly, there appears to be a range of formulated rumen undigested NDF in diets for dairy cows where optimum combinations of intake and digestibility exist to support higher levels of animal productivity.

Study 2: This study examined the influence of corn silage hybrid (Croplan 6818, 6100 or 6831) and wheat straw level (0 or 3 percent) on total tract digestibility, energy balance, nitrogen balance and milk component yield in post-peak lactating cows consuming diets equal in metabolizable energy, starch and metabolizable protein.

With the increased inclusion of corn silage in feeding programs for lactating dairy cows, more information is needed on how various silage hybrids affect nutrient digestibility and metabolism in diets of variable Neutral Detergent Fiber (NDF) digestibility. A one unit increase in in-vitro digestibility of NDF was associated with a 0.37 lb/day increase in dry matter intake (DMI) and a 0.55 lb/day increase in 4 percent fat corrected milk yield per cow (Oba and Allen, 1999). The increased rate of passage through the gastrointestinal tract that accompanies increased DM intake, can cause rates of passage that exceed rates of digestion, resulting in depressed diet digestibility and reduced feed efficiency. Manipulating the rate of feed passage by incorporating wheat straw into the diet to manipulate the rumen undigested forage fiber amount, should provide a method of determining the relationship between rumen undigested forage amounts and total diet digestibility.

Corn silage contains both fiber and starch. The ruminal starch digestibility from corn in corn silage is usually greater than from dry shelled corn. More information is also needed on the effect of silage dry down rate on starch degradability from the corn in corn silage.

The present study evaluated 3 corn silage hybrids, 6818 (lower NDF digestibility; NDFd), 6100 (higher NDFd) and 6831 (slow plant dry down) in diets formulated to be similar in ME (1.31. mcal/lb DM), MP (12.3 percent), CP (17.5 percent) and starch (25 percent), but of different NDFd. As such, all three hybrids will be fed at two levels of straw (0 vs. 3 percent) in the diet. Results should help refine optimum mass of rumen undigested NDF (RUNDF) in the diet, above which feed digestibility and feed efficiency potential increases, and below which DM intake potential increases.

Materials and Methods: The materials and methods of Study 2 were the same as those followed in Study 1.

Tables 6-8 below provide a listing of the composition of the diets of Study 2 and Table 9 provides results of Study 2.

TABLE 6

Study 2

| | Corn Silage Hybrid | Corn Silage, % of DM | Alf Hay, % of DM | Straw, % of DM | Starch, % |
|---|---|---|---|---|---|
| A | 6818 | 40 | 10 | 0 | 25 |
| B | 6100 | 40 | 10 | 0 | 25 |
| C | 6831 | 40 | 10 | 0 | 25 |
| D | 6818 | 40 | 7 | 3 | 25 |
| E | 6100 | 40 | 7 | 3 | 25 |
| F | 6831 | 40 | 7 | 3 | 25 |

TABLE 7

Rations for Diets of Study 2

| | Treatment: | | | | | |
|---|---|---|---|---|---|---|
| | 1 | 2 | 3 | 4 | 5 | 6 |
| | % of Diet DM | | | | | |
| No Straw Corn Silage Ration | 50 | 50 | 50 | | | |
| 3% Straw Corn Silage Ration | | | | 50 | 50 | 50 |
| Corn Silage 6818 | 40 | | | 40 | | |
| Corn Silage 6100 | | 40 | | | 40 | |
| Corn Silage 6831 | | | 40 | | | 40 |
| Alfalfa Hay | 10 | 10 | 10 | 7 | 7 | 7 |
| Wheat Straw (Chopped) | 0 | 0 | 0 | 3 | 3 | 3 |

TABLE 8

Study 2 Percent composition of grain mixes

| | No Straw Ration | Straw Ration |
|---|---|---|
| Gr Corn Fine | 41.2 | 41.3 |
| Gr Soybean Hulls | 16.0 | 13.1 |
| Dehulled Soymeal | 22.8 | 27.5 |
| Surepro | 11.0 | 8.8 |
| Macro and Micro Nutrients | 8.0 | 8.0 |

TABLE 9

Influence of Corn Silage Hybrid (Croplan 6818, 6100 or 6831) and Wheat Straw Level (0 or 3%) on Total Tract Digestibility, Energy Balance, Nitrogen Balance and Milk Component Yield in Post-Peak Lactating Cows Consuming Diets Equal in ME, Starch and MP

| Wheat Straw | None | None | None | 3% | 3% | 3% | | | | |
| Corn Silage | 6818 | 6100 | 6831 | 6818 | 6100 | 6831 | SE | (1) | (2) | (3) |
|---|---|---|---|---|---|---|---|---|---|---|
| DM Digested % of Int | $64.0^a$ | $65.5^{ab}$ | $65.3^{ab}$ | $66.6^{ab}$ | $68.0^b$ | $66.1^{ab}$ | 1.15 | .05 | — | — |
| Org Matter Dig % of Int | $65.7^a$ | $67.2^{ab}$ | 67.2ab | $68.0^{ab}$ | $69.7^b$ | $67.9^{ab}$ | 1.08 | .06 | — | — |
| N Digested % of Intake | $63.4^a$ | $65.9^{ab}$ | $66.5^b$ | $67.3^b$ | $68.1^b$ | $67.6^b$ | 1.0 | .01 | .20 | — |
| Dig Energy % of Intake | 64.3 | 65.6 | 65.8 | 66.4 | 67.9 | 66.8 | 1.22 | .09 | — | — |
| Dig Energy, MCal/kg DM | 2.87 | 2.93 | 2.93 | 2.96 | 3.03 | 2.97 | 0.05 | .10 | — | — |
| NDF Digested % of Int | $32.9^a$ | $38.7^{ab}$ | $34.7^a$ | $38.1^a$ | $46.5^b$ | 36.4a | 2.75 | .04 | .03 | — |
| Hemicell Dig. % of Int | $39.6^a$ | $48.3^{ab}$ | $41.5^a$ | $47.1^{ab}$ | $55.4^b$ | $44.0^a$ | 3.22 | .05 | .02 | — |

PR > F if <.20 for
(1) WHSTRAW
(2) CSHYB
(3) WHSTRAW*CSHYB

Means in the same row not followed by a common letter differ(P < .05) using LSD procedure.

Discussion: When 3 percent wheat straw replaced 3 percent alfalfa hay, digestibility increased for dry matter (DM; P<0.05), organic matter (OM; P<0.06), protein nitrogen (N; P<0.01) and neutral detergent fiber (NDF; P<0.04). When 3 percent wheat straw replaced 3 percent alfalfa hay, the digestible energy (DE) content of the diet increased (P<0.10). There were differences among corn silage hybrids in NDF digestibility (P<0.03), with a tendency (P<0.20) for differences in protein N digestibility. The above changes had no significant effect on DM intake or fat corrected milk (FCM) production, while there was a tendency (P<0.20) for an increase in retained energy on the 3 percent straw diets.

Conclusion: While adding wheat straw reduced the formulated diet energy density of the diets, these results show that the subsequent contributions to the rumen undigested fiber mass increased the digestibility of major fractions (DM, OM and DE) and nutrients (NDF and protein N) in the diet. It appeared that the increased digested nutrient supply was partitioned to body reserves, rather than increased milk production. These observations were presumably due to the increased residence time of the diet in the rumen when straw was included, despite DMI not being significantly affected, allowing for more complete digestion. This would suggest that there may be an optimum mass of rumen undigested NDF (RUNDF), above which intake may be limited by bulk fill but digestibility and feed efficiency is maximized and below which intake can increase, but possibly at the expense of reduced digestion and, subsequently, feed efficiency.

Study 3: This study examined the influence of corn silage hybrids (Croplan6631, 7505 or BMR) and wheat straw level (0 or 4 percent) on total tract digestibility, energy balance, nitrogen balance and milk component yield in post-peak lactating cows consuming diets equal in metabolizable energy, starch and metabolizable protein. Compared to Study 2, Study 3 provided more information on the effect of silage NDF digestibility on intake and digestible energy content of the diet.

This study evaluated three corn silage hybrids, 6631 (dual purpose), 7505 (dual purpose) and brown midrib corn silage (BMR; Mycogen; higher NDFd) in diets formulated to be similar in Metabolizable Energy (ME; 1.31 mcal/lb DM), Metabolizable Protein (MP; 11.4 percent) and starch (25 percent). All three hybrids were fed at two levels of wheat straw in the diet (0 vs. 4 percent) to change the undigested forage NDF level. Results should help refine optimum rumen undigested forage NDF targets in the diet, above which feed digestibility and feed efficiency potential increases, and below which DM intake potential increases.

Materials and Methods: The materials and methods of Study 3 were the same as those followed in Study 1.

Tables 10-12 below provide a listing of the composition of the diets of Study 3 and Table 13 provides results of Study 3.

TABLE 10

Study 3

| | Corn Silage Hybrid | Corn Silage, % of DM | Alf Hay, % of DM | Straw, % | ME, mcal/lb DM | MP, % | CP, % |
|---|---|---|---|---|---|---|---|
| A | 6631 | 40 | 10 | 0 | 1.31 | 11.4 | 17 |
| B | 7505 | 40 | 10 | 0 | 1.31 | 11.4 | 17 |
| C | BMR | 40 | 10 | 0 | 1.31 | 11.4 | 17 |
| D | 6631 | 40 | 6 | 4 | 1.31 | 11.4 | 17 |
| E | 7505 | 40 | 6 | 4 | 1.31 | 11.4 | 17 |
| F | BMR | 40 | 6 | 4 | 1.31 | 11.4 | 17 |

TABLE 11

Rations for Diets of Study 3

| | Treatment: | | | | | |
|---|---|---|---|---|---|---|
| | 1 | 2 | 3 | 4 | 5 | 6 |
| | % of DM | | | | | |
| No Straw Ration A | 50 | 50 | 50 | | | |
| Straw Ration B | | | | 50 | 50 | 50 |
| Corn Silage 6631 | 40 | | | 40 | | |
| Corn Silage 7505 | | 40 | | | 40 | |
| Corn Silage BMR | | | 40 | | | 40 |
| Alfalfa Hay | 10 | 10 | 10 | 6 | 6 | 6 |
| Straw | 0 | 0 | 0 | 4 | 4 | 4 |

TABLE 12

Study 3 Percent composition of grain mixes

| | No Straw Ration | Straw Ration |
|---|---|---|
| Gr Corn Fine | 41.2 | 41.4 |
| Gr Soybean Hulls | 15.8 | 11.7 |
| Dehulled Soymeal | 22.9 | 29.3 |
| Surepro-KL | 11.0 | 8.0 |
| Macro and Micro Nutrients | 9.1 | 9.6 |

TABLE 13

Influence of Corn Silage Hybrid (Croplan 6631, 7505 or BMR) and Wheat Straw Level (0 vs. 4%) Post-Peak Lactating Cows Consuming Diets Equal in ME, Starch and MP.

| Straw | None | None | None | 4% DM | 4% DM | 4% DM | | | | |
|---|---|---|---|---|---|---|---|---|---|---|
| Silage Hyb | 6631 | 7505 | BMR | 6631 | 7505 | BMR | SE | (1) | (2) | (3) |
| % Milk Fat (IR) | $2.68^{abc}$ | $2.91^{bc}$ | $2.32^{a}$ | $2.92^{bc}$ | $2.53^{ab}$ | $3.12c$ | 0.17 | .13 | — | .01 |
| DM Intake, kg/d | $21.2^{ab}$ | $20.5^{a}$ | $23.6^{b}$ | $20.2^{a}$ | $21.6^{ab}$ | $23.1^{ab}$ | 0.98 | — | .03 | — |
| N Digested % of Intake | 70.7 | 70.6 | 69.8 | 72.9 | 72.6 | 70.6 | 1.25 | .13 | — | — |
| N Retained % of Intake | $3.29^{abc}$ | $-0.52^{a}$ | $2.02^{ab}$ | $11.14^{d}$ | $6.25^{bc}$ | $7.28^{cd}$ | 1.51 | .01 | .04 | — |

[1] PR > F if <.20 for (1) STRAW_

(2) SILAGE (3) STRAW_*SILAGE.

Means in the same row not followed by a common letter differ(P < .05) using LSD procedure.

Discussion: When 4 percent wheat straw replaced 4 percent alfalfa hay, milk fat percent on the BMR silage containing diets increased from 2.32 percent to 3.12 percent (P<0.01). DM intake was influenced by silage hybrid (P<0.03) and tended to be highest with the BMR silage containing diets. Nitrogen (N) retention was influenced by both wheat straw inclusion (P<0.01) and silage hybrid (P<0.04), with N retention being improved on the high straw containing diets.

Summary: While the BMR silage containing diet increased DM intake (presumably, because of a higher in vitro NDF digestibility), milk fat percent and yield was increased significantly by the addition of wheat straw of lower NDF digestibility. Furthermore, adding wheat straw increased protein nitrogen retention across all diets. This would suggest that a higher forage NDF digestibility (by feeding BMR silage) does not necessarily result in higher milk fat synthesis and there appears to be an optimum undigested forage NDF level in the diet that promotes maximum milk fat yields.

Figure 9:
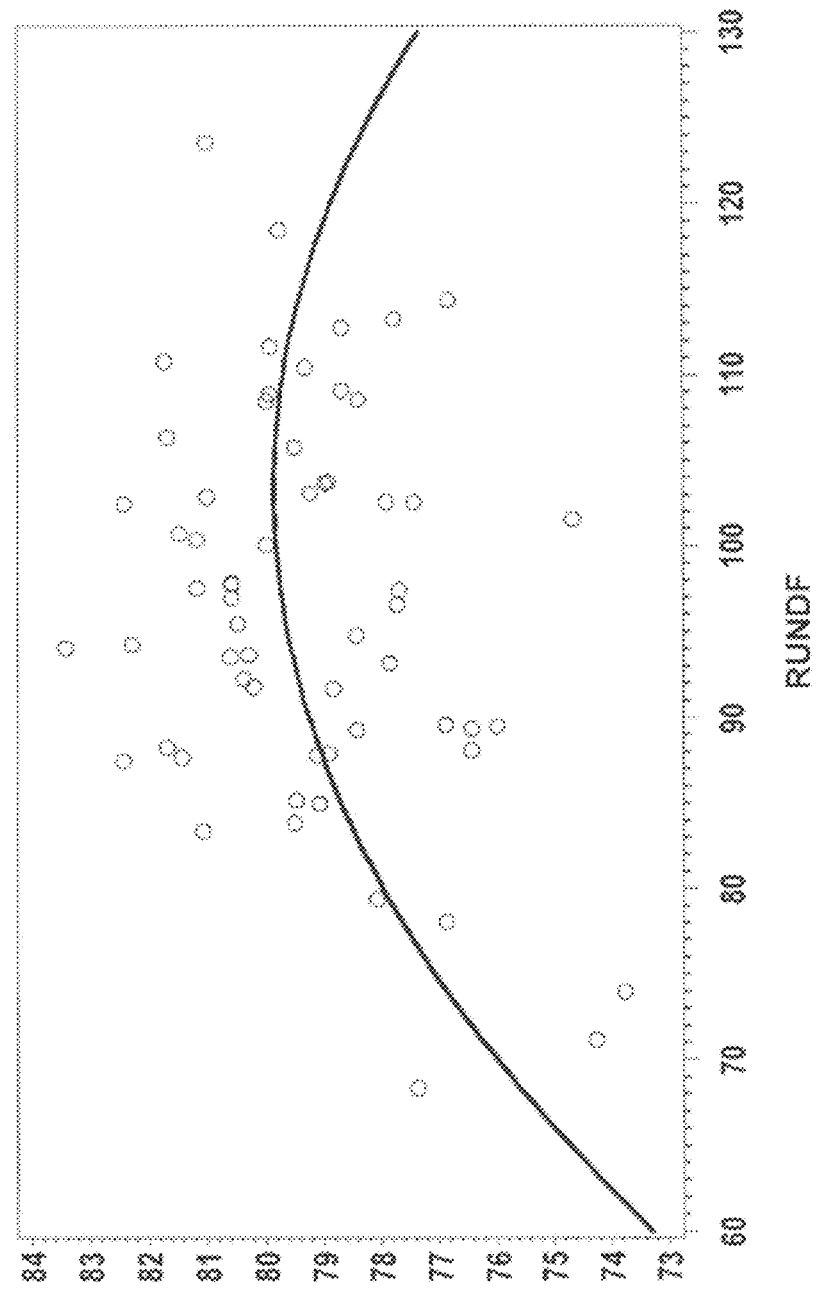
FIG. 9 shows a graph illustrating milk production for lactating cows and an associated RUNDF score.

Field Study1: In this study, ten herds were observed in which forages were collected and analyzed according to method 100. For example, samples were measured for NDF and 28 hour in vitro NDFd (converted to FPN using internal standards of known in vivo ruminal NDF digestibility). No ration adjustments were made. Rather, the RUNDF score from the diet formula was tracked and compared with DM intake and milk production response differences. As depicted in FIG. 9, the results show that milk production was at a maximum when RUNDF scores ranged from about 100 to 105. In addition, as shown in FIG. 10, bulk fill limitations to intake appear not to exist at RUNDF scores below 100, as dry matter intakes appeared not to increase. Consequently, at milk production averages below 90 lbs of milk and RUNDF scores below 110, lowering the RUNDF score will likely not increase DMI. However, milk increases may result from increasing RUNDF scores, when they are below 100, due to improvements in digestibility. This may be applicable when the animal's energy intake is in excess of milk requirements, and more than expected weight gain can justify.

The embodiments provided herein may be used to increase dry matter intake and milk production, increase feed efficiency and digestion while maintaining or increasing milk production, increasing dietary forage levels compared to corn grain, for example, and may safely increase dietary energy.

The embodiments provided herein may benefit the dairy producer where ingredient cost savings is desirable by substituting high cost ingredients such as corn grain with lower cost ingredients such as silage, while not affecting milk production, e.g., while maintaining desired milk production levels. This may also provide the producer with informed or improved economic evaluations of ratio of feed costs to milk production costs.

Implementations may also be used to manage feed inventory. For example, the dairy producer having limited starch resources may benefit by adjusting the diet to a low starch intake in combination with a large RUNDF mat, while not adversely affecting milk production. In another example, where feed components are readily available, the methods provided herein benefit the producer because ruminal acidosis due to over-production of propionate may be avoided by adjusting starch and fiber intake.

The embodiments provided herein are also useful in crop planting planning because hybrid selection and harvest and feed storage management may be adjusted based on the calculated values. This also enables the producer to effectively manage their feed inventory.

Methods for adjusting starch and fiber content in diets may be applicable to a number of different types of animals, and thus the methods provided herein are not limited to ruminants. For example, birds such as chicken, turkeys and ducks may be fed a diet formulated according to the methods provided herein. A positive correlation between bird weight gain and GPN ratings of corn enables improvements to average daily gains in birds, which brings a flock to market faster, resulting in feed savings.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The above disclosure may be provided as a computer program product, or software, that may include a data storage units provided as non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on. Accordingly, the methods provided herein may be implemented on a computer system communicatively coupled to other computer systems, and/or on a communicatively coupled network of computers, having processing units, memory storage units, communications units, and communication links. The processing units retrieve and execute commands stored in the memory storage units and provide output in the form of a delivered message or delivering output to a communicatively coupled display.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them, and variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of calculating a feed ration for a ruminant, the method comprising:
   obtaining samples of one or more forages and grains from available feed sources;
   determining ruminant feeding rates of the sampled one or more forages and grains;
   analyzing the one or more samples to determine a starting neutral detergent fiber (NDF) value and an ending NDF value after ruminal digestion, wherein analyzing the one or more samples comprises using one or more of near infrared (NIR) analysis, infrared reflectance spectroscopy, spectrophotometric methods, duodenal cannulas, in situ measurements, in vitro analysis or in vivo analysis;
   calculating a ruminal undigested NDF fraction for the one or more samples by dividing the ending NDF value by the starting NDF value, the ruminal undigested NDF fraction representing a percent remaining NDF fraction or a predicted percent remaining NDF fraction in the rumen after ruminal digestion; and
   calculating a feed ration using the ruminal undigested NDF fraction and feeding rates of the one or more analyzed samples, wherein the calculated feed ration comprises at least a fiber component calculated based on an amount of ruminal undigested NDF targeted for the rumen of the ruminant, the amount of ruminal undigested NDF targeted for the rumen comprising a sum of ruminal undigested NDF for each of the forages in the feed ration, the ruminal undigested NDF for each of the forages calculated by multiplying pounds of a forage in the ration by a percentage of NDF in the forage and by the ruminal undigested NDF fraction in the forage;
   wherein at least one of the steps of analyzing, calculating a ruminal undigested NDF fraction or calculating a feed ration is performed by a computer processor.

2. The method of claim 1, further comprising:
   analyzing the one or more samples to determine a starting starch value and an ending starch value after ruminal digestion;
   using the starting and ending starch values of the one or more analyzed samples to calculate a ruminal starch digestibility; and
   calculating the feed ration using the ruminal starch digestibility of the one or more analyzed samples.

3. The method of claim 2, wherein the calculated ruminal starch digestibility comprises an indexing value.

4. The method of claim 3, wherein the indexing value is determined based on comparing the ruminal digested starch fraction with an indexing system having a linear relationship to known in vivo starch digestibility values of a set of previously analyzed forages and grains.

5. The method of claim 1, wherein the step of calculating a feed ration is in relation to pre-existing dietary targets corresponding to a pre-determined milk production level by the ruminant, and wherein calculating the feed ration comprises increasing a level of ruminal undigested NDF targeted for the rumen relative to the pre-existing dietary targets to obtain a higher feed efficiency and digestibility with a milk production level substantially the same as the pre-determined milk production level.

6. The method of claim 1, wherein the step of calculating a feed ration is in relation to pre-existing dietary targets corresponding to a pre-determined milk production level by the ruminant, and wherein calculating the feed ration comprises decreasing a level of ruminal undigested NDF targeted for the rumen relative to the pre-existing dietary targets to obtain a higher dry matter intake and a higher milk production compared to the pre-determined milk production level.

7. The method of claim 1, wherein the step of calculating a feed ration is to improve one or more of milk production or milk component production, and wherein a level of ruminal undigested NDF is calculated to be about 8 to about 13 weight percent in relation to dry matter in the feed ration.

8. The method of claim 7, wherein a level of ruminally digestible starch in the feed ration is calculated to be about 12 to about 20 weight percent in relation to the dry matter in the feed ration.

9. The method of claim 1, wherein the step of calculating a feed ration is to improve one or more of dry matter intake or increase energy intake, and wherein a level of ruminal undigested NDF is calculated to be about 6 to 11 weight percent in relation to dry matter in the feed ration.

10. The method of claim 9, wherein a level of ruminally digestible starch in the feed ration is calculated to be about 10 to about 18 weight percent in relation to the dry matter in the feed ration.

11. The method of claim 1, wherein the step of calculating a feed ration is to increase one or more of feed efficiency or digestibility, and wherein a level of ruminal undigested NDF is calculated to be about 10 to 15 weight percent in relation to dry matter in the feed ration.

12. The method of claim 11, wherein a level of ruminally digestible starch in the feed ration is calculated to be about 12 to about 20 weight percent in relation to the dry matter in the feed ration.

13. The method of claim 1, wherein the step of calculating a feed ration is to increase dietary energy density, and wherein a level of ruminal undigested NDF is calculated to be about 8 to 13 weight percent in relation to dry matter in the feed ration.

14. The method of claim 13, wherein a level of ruminally digestible starch in the feed ration is calculated to be about 14 to about 22 weight percent in relation to the dry matter in the feed ration.

15. The method of claim 1, wherein the step of calculating a feed ration is to reduce feed costs, the step of calculating a feed ration further comprising determining a cost of the sampled one or more forages and grains from available feed sources, and replacing higher cost available feed sources of ruminal undigested NDF with lower cost available feed sources of ruminal undigested NDF while targeting a selected level of ruminal undigested NDF.

16. The method of claim 15, further comprising replacing higher cost feed sources of ruminally digestible starch with lower cost available feed sources of ruminally digestible starch while targeting a selected level of ruminally digestible starch.

* * * * *

UNITED STATES PATENT AND TRADEMARK OFFICE
CERTIFICATE OF CORRECTION

| | |
|---|---|
| PATENT NO. | : 8,949,035 B2 |
| APPLICATION NO. | : 13/452510 |
| DATED | : February 3, 2015 |
| INVENTOR(S) | : David Weakley |

It is certified that error appears in the above-identified patent and that said Letters Patent is hereby corrected as shown below:

DRAWINGS

Replace Sheet 8 of 16, Figure 3B with attached page.

SPECIFICATION

| Column | Line | PTO | Should Be |
|---|---|---|---|
| 7 | 8 | "maltose, cassaya," | -- maltose, cassava, -- |
| 14 | 50 | "maltose, cassaya," | -- maltose, cassava, -- |

Signed and Sealed this
Fifteenth Day of December, 2015

Michelle K. Lee
*Director of the United States Patent and Trademark Office*

FIG. 3B

Example of using the Calibrate Calculator to reduce feed costs in the diet by substituting high cost ingredients (fine ground corn) with low cost ingredients (corn silage, soy hulls). Reuslting dietary cost savings was approximately $0.34/cow/day.

Low Corn Silage
All Amounts are shown on a DM basis
Enter values in the colored fields from the Starch Analysis Sheet
Don't Enter GPN values less than 0 or greater than 11

Save Proposed Result

Retrieve Values fr

Current

| | lb DM | Starch, % | Starch, lb | GPN | Forage NDF, % | Forage NDF, lb | FPN |
|---|---|---|---|---|---|---|---|
| Alfalfa Hay, Early B | 15.3 | 0.00% | 0.00 | | 40.00% | 6.12 | 120 |
| Corn Silage | 15.3 | 35.00% | 5.36 | 8 | 46.00% | 7.04 | 140 |
| Corn, Fine Gr. | 8.66 | 70.00% | 6.06 | 3 | | 0.00 | |
| Soybean Hulls | 0.35 | 0.00% | 0.00 | | | 0.00 | |
| Soybean Meal 48 | 8 | 0.00% | 0.00 | | | 0.00 | |
| SurePro | 3.66 | 0.00% | 0.00 | | | 0.00 | |
| Animal Fat | 0.4 | 0.00% | 0.00 | | | 0.00 | |
| Wheat Straw | 3.60 | 0.00% | 0.00 | | 80.00% | 0.00 | 100 |
| | | | 0.00 | | | 0.00 | |
| | | | 0.00 | | | 0.00 | |

DMI, lb/day: 51
Sum (lb) = 11.42
Starch = 22.4%   100.4% of optimum
Starch + sugars = 24.4%
Forage NDF= 25.8%   100.7% of optimum
Sum = 13.16
Max. PUFA, g/day 123

Proposed

| | lb DM | Starch, % | Starch, lb | GPN | NDF, % | NDF, lb | FPN |
|---|---|---|---|---|---|---|---|
| Alfalfa Hay, Early Blo | 2.55 | 0.00% | 0.00 | 0 | 40.00% | 1.02 | 120 |
| Corn Silage | 28.05 | 35.00% | 9.82 | 8 | 46.00% | 12.90 | 140 |
| Corn, Fine Gr. | 0 | 70.00% | 0.00 | 3 | 0.00% | 0.00 | 0 |
| Soybean Hulls | 8.03 | 0.00% | 0.00 | 0 | 0.00% | 0.00 | |
| Soybean Meal | 6.92 | 0.00% | 0.00 | | | 0.00 | |
| SurePro | 2.94 | 0.00% | 0.00 | | | 0.00 | |
| Animal Fat | 0.91 | 0.00% | 0.00 | | | 0.00 | |
| Wheat Straw | 0 | 0.00% | 0.00 | | 80.00% | 0.00 | 100 |
| | | | 0.00 | | | 0.00 | |
| | | | 0.00 | | | 0.00 | |

DMI, lb/day: 51
Sum (lb) = 9.82
Starch = 19.3%   102.3% of optimum
Starch + sugars = 21.3%
Forage NDF=2 27.3%   98.9% of optimum
Sum = 13.92
Max. PUFA, g/day 123